US012434874B2

(12) United States Patent
Franzaroli

(10) Patent No.: US 12,434,874 B2
(45) Date of Patent: Oct. 7, 2025

(54) UNIT FOR CONTROLLING OR MANAGING PRODUCTS

(71) Applicant: PULSAR S.R.L., Castel Maggiore (IT)

(72) Inventor: Massimo Franzaroli, Castel Maggiore (IT)

(73) Assignee: PULSAR S.R.L., Castel Maggiore (IT)

(*) Notice: Subject to any disclaimer, the term of this patent is extended or adjusted under 35 U.S.C. 154(b) by 0 days.

(21) Appl. No.: 17/480,618

(22) Filed: Sep. 21, 2021

(65) Prior Publication Data
US 2022/0002014 A1 Jan. 6, 2022

Related U.S. Application Data

(62) Division of application No. 15/550,950, filed as application No. PCT/IB2016/051031 on Feb. 25, 2016, now Pat. No. 11,142,360.

(30) Foreign Application Priority Data

Feb. 27, 2015 (IT) .......................... BO2015U000016
May 4, 2015 (IT) .......................... BO2015U000039
Jun. 19, 2015 (IT) ......................... 202015000025907

(51) Int. Cl.
B65B 25/14 (2006.01)
B65B 11/58 (2006.01)
(Continued)

(52) U.S. Cl.
CPC .......... B65B 25/146 (2013.01); B65B 11/585 (2013.01); B65B 35/10 (2013.01);
(Continued)

(58) Field of Classification Search
CPC ..... B65B 25/146; B65B 11/585; B65B 35/10; B65B 57/00; B65B 57/02; B65B 57/10;
(Continued)

(56) References Cited

U.S. PATENT DOCUMENTS 3,098,565 A 7/1963 Fouse et al.
3,449,887 A * 6/1969 Abramson .............. B65B 57/04
53/76
(Continued)

FOREIGN PATENT DOCUMENTS

CN 104142349 A 11/2014
EP 0854090 A1 7/1998
(Continued)

OTHER PUBLICATIONS

International Search Report and Written Opinion dated Jun. 10, 2016 for related International Patent Application No. PCT/IB2016/051029.
(Continued)

Primary Examiner — Kyle O Logan
(74) Attorney, Agent, or Firm — SHUTTLEWORTH & INGERSOLL, PLC; Timothy J. Klima

(57) ABSTRACT

A unit for the control or management of articles includes a plant including an operating line including an upstream section for making the articles, including a log saw for cutting rolls off elongate logs, a packaging section including a packing section where the articles or rolls are packed, and a bagging section where the packs are placed in bags and/or a palletizing section where the packs or bags are placed on pallets. A conveying section transports products between the upstream section and the packaging section and/or between one packaging section and another downstream. A process controller controls the functioning of the plant sections. The unit includes a device for detecting and/or lighting a face of the product or pack and which is adapted to produce different images of the face, to exhibit different states of reflection of the light that is incident upon the face.

10 Claims, 20 Drawing Sheets

(51) Int. Cl.
  *B65B 35/10* (2006.01)
  *B65B 57/00* (2006.01)
  *B65B 57/02* (2006.01)
  *B65B 57/10* (2006.01)
  *B65B 65/00* (2006.01)
  *G01N 21/90* (2006.01)
  *G01N 21/95* (2006.01)
  *G06T 7/00* (2017.01)
  *B65B 11/00* (2006.01)

(52) U.S. Cl.
  CPC .............. *B65B 57/00* (2013.01); *B65B 57/02* (2013.01); *B65B 57/10* (2013.01); *B65B 65/006* (2013.01); *G01N 21/90* (2013.01); *G01N 21/95* (2013.01); *G06T 7/0002* (2013.01); *G06T 7/0004* (2013.01); *G06T 7/0006* (2013.01); *G06T 7/0008* (2013.01); *G06T 7/001* (2013.01); *B65B 11/00* (2013.01); *B65B 2210/02* (2013.01); *G06T 2207/30108* (2013.01); *G06T 2207/30124* (2013.01)

(58) Field of Classification Search
  CPC ... B65B 65/006; B65B 11/00; B65B 2210/02; G01N 21/95
  See application file for complete search history.

(56) References Cited

U.S. PATENT DOCUMENTS

| | | | | |
|---|---|---|---|---|
| 4,308,959 | A * | 1/1982 | Hoover | B07C 5/3422 |
| | | | | 209/939 |
| 4,593,806 | A * | 6/1986 | Tappe | B65G 47/5122 |
| | | | | 198/437 |
| 5,255,495 | A | 10/1993 | Kovacs et al. | |
| 5,917,034 | A | 6/1999 | Brown et al. | |
| 5,917,934 | A * | 6/1999 | Chiu | G06T 7/0006 |
| | | | | 348/125 |
| 6,054,665 | A | 4/2000 | Focke et al. | |
| 6,373,519 | B1 * | 4/2002 | Sybert | G01N 21/88 |
| | | | | 348/86 |
| 6,994,206 | B2 * | 2/2006 | Adamski | B65B 35/44 |
| | | | | 198/570 |
| 8,073,239 | B1 | 12/2011 | Bahrami et al. | |
| 2001/0012381 | A1 | 8/2001 | Sari-Sarraf | |
| 2001/0028732 | A1 | 10/2001 | Coulombe | |
| 2001/0042359 | A1 * | 11/2001 | Franzaroli | G05B 19/41865 |
| | | | | 53/435 |
| 2002/0108353 | A1 * | 8/2002 | Franzaroli | B65B 35/44 |
| | | | | 53/435 |
| 2004/0030514 | A1 | 2/2004 | Popp | |
| 2004/0123570 | A1 * | 7/2004 | Franzaroli | B65B 35/44 |
| | | | | 53/493 |
| 2007/0058840 | A1 | 3/2007 | Singh | |
| 2010/0082152 | A1 | 4/2010 | Mishra | |
| 2010/0276344 | A1 * | 11/2010 | Yamada | B07C 5/342 |
| | | | | 209/552 |
| 2010/0292828 | A1 * | 11/2010 | Einarsson | B07C 5/38 |
| | | | | 83/13 |
| 2012/0120229 | A1 | 5/2012 | Brantley et al. | |
| 2014/0091013 | A1 * | 4/2014 | Streufert | B65G 47/46 |
| | | | | 209/552 |
| 2014/0146169 | A1 | 5/2014 | Ollivier et al. | |
| 2014/0226892 | A1 | 8/2014 | Kral et al. | |
| 2014/0247347 | A1 | 9/2014 | McNeill | |
| 2014/0290036 | A1 | 10/2014 | Olbrich et al. | |
| 2014/0300734 | A1 | 10/2014 | Binetruy | |
| 2015/0001137 | A1 * | 1/2015 | Layne | B65G 37/00 |
| | | | | 209/552 |
| 2015/0212010 | A1 | 7/2015 | Lin | |
| 2015/0241341 | A1 | 8/2015 | Ikeda | |
| 2015/0241360 | A1 | 8/2015 | Niemela et al. | |
| 2015/0264319 | A1 * | 9/2015 | Wood | B65B 19/30 |
| | | | | 348/125 |
| 2017/0191946 | A1 | 7/2017 | Smith | |
| 2018/0008104 | A1 | 1/2018 | Becker | |
| 2018/0099769 | A1 * | 4/2018 | McDonald | B65B 57/04 |

FOREIGN PATENT DOCUMENTS

| | | | |
|---|---|---|---|
| GB | 1367105 | A | 9/1974 |
| GB | 2102758 | A | 2/1983 |
| JP | 2009186193 | A | 8/2009 |
| WO | 2006117150 | A1 | 11/2006 |
| WO | 2007144920 | A1 | 12/2007 |
| WO | 2008117150 | A2 | 10/2008 |
| WO | 2013054719 | A1 | 4/2013 |

OTHER PUBLICATIONS

International Search Report and Written Opinion dated Aug. 31, 2016 for related International Patent Application No. PCT/IB2016/051035.
International Search Report and Written Opinion dated Aug. 31, 2016 for related International Patent Application No. PCT/IB2016/051031.
European Office Action dated Aug. 15, 2018 for related European Patent Application No. 16719477.8.
European Office Action dated Aug. 15, 2018 for related European Patent Application No. 16718448.0.
European Office Action dated Jul. 30, 2019 for related European Patent Application No. 16719477.8.
European Search Report dated Jul. 26, 2019 for related European Patent Application No. 1167874.
European Search Report dated Feb. 18, 2021 for related European Patent Application No. 20197174.4.
Franzaroli, Massimo—U.S. Appl. No. 15/550,242, filed Aug. 10, 2017.
Franzaroli, Massimo—U.S. Appl. No. 15/550,950, filed Aug. 14, 2017.
Franzaroli, Massimo—U.S. Appl. No. 16/870,617, filed May 8, 2020.
Franzaroli, Massimo—U.S. Appl. No. 17/146,166, filed Jan. 11, 2021.
European Search Report dated Oct. 20, 2021 from counterpart European Patent Application No. EP20207907.5.
European Office Action dated Jul. 24, 2024 from counterpart EP App No. 20197174.4.

* cited by examiner

55'   55'   55'

UNIT FOR CONTROLLING OR MANAGING PRODUCTS

This application is a divisional of U.S. patent application Ser. No. 15/550,950 filed Aug. 14, 2017, which is a National Phase of International Application PCT/IB2016/051031 filed Feb. 25, 2016 which designated the U.S. and that International Application was published under PCT Article 21 (2) in English.

This application claims priority to Italian Application No. BO2015U000016 filed Feb. 27, 2015, Italian Application No. BO2015U000039 filed May 4, 2015 and Italian Application No. 202015000025907 filed Jun. 19, 2015, which applications are incorporated by reference herein.

TECHNICAL FIELD

This invention relates to a unit for controlling or managing products, in particular packs.

BACKGROUND ART

Known in the prior art in the tissue paper industry are plants for the production of articles and corresponding packaging, such as rolls and hand or face wipes of paper material, which are packed in corresponding packets, packs, bags, pallets or other.

Generally speaking, these prior art plants comprise at least one operating line including at least one upstream section for making the articles, in particular in the form of log saws for cutting rolls off respective elongate logs, and at least one respective packaging section, in particular for primary packaging, preferably in the form of a packing section where the articles or rolls are packed.

Prior art plants may also include one or more further packaging sections, in the form of a section for cartoning or bagging the packs and/or a section for palletizing the packs or cartons/bags.

Prior art plants also include conveying means by which the products are transported between one section of the plant and another, in particular between the means which make the articles and the respective packaging section and between one packaging section and another in the downstream part of the plant.

However, in plants of the above mentioned type in the tissue industry—but also in plants for making other types of products—, although the large quantities of articles made are of satisfactory quality, a certain number of defective end products are produced which are only occasionally removed, completely manually, by machine operators and which, as a result, are unfortunately placed on the market and eventually reach end users.

Even today, therefore, prior art plants of this kind continue to produce defective products which do not measure up to consumer quality standards.

Moreover, in prior art plants of this kind, it is difficult to promptly determine the causes of defective products with any degree of certainty.

In short, prior art plants of this kind produce non-negligible quantities of defective products which machine operators find it difficult to pick out but which nevertheless lead to production losses for the companies which use these production plants.

Furthermore, there is also in the industry a generally felt need for machinery and equipment which are relatively low in cost and/or which do not have excessive impact on normal production activities.

Yet another need felt by the industry is that for machinery and equipment that is easy for operators to install and/or use.

A further need felt by the industry is that for machinery and equipment which can operate at relatively high speeds and/or with particularly high levels of effectiveness and efficiency.

Another problem which is felt particularly strongly in the industry is the detection of defects on product packs or packaging where the packaging material is transparent and thus substantially invisible to prior art detection methods and means.

Disclosure of the Invention

This invention therefore proposes a new solution as an alternative to the solutions known up to now and, more specifically, proposes to overcome one or more of the above mentioned drawbacks or problems and/or to meet one or more of the needs felt by the trade and which, in particular, may be inferred from the above.

It is accordingly provided a unit for the control or management of products, in particular in the form of packs, preferably for containing respective articles, especially in the form of articles of the tissue industry, preferably of paper or other material such as fabric or non-woven fabric, the articles being preferably in the form of rolls or packages, in particular packs, packets or other containers, preferably of or for toilet paper, kitchen paper, napkins, tissue handkerchiefs, hand and face wipes, hand towels, bedsheets and the like, or of or for rolls of material for kitchen use such as aluminium foil, plastic wrap, greaseproof paper and the like; the unit being preferably usable in a plant for making such products, the plant preferably comprising at least one operating line including at least one upstream section for making the articles, in particular in the form of a log saw for cutting rolls off respective elongate logs, at least one respective packaging section, in particular for primary packaging, preferably in the form of a packing section where the articles or rolls are packed and preferably at least one or more further packaging sections, in particular in the form of at least one bagging section where the packs are placed in bags and/or one palletizing section where the packs or bags are placed on pallets; the plant comprising a conveying section, or means, by which the products are transported between one section of the plant and another, in particular between the means which make the articles and the respective packaging section and/or between one packaging section and another downstream; the plant being provided with process control means for controlling the functioning of the plant sections; preferably the control or management unit having respective electronic processing or control means; characterized in that it comprises means for detecting and/or lighting a respective face of the product or pack and which are adapted, or suitable for, producing different images of the respective product face, in particular which exhibit different states of reflection of the light that is incident upon the respective product face.

That way, it is possible to detect defects even on transparent products such as wrappers for packs or packages of the tissue industry.

BRIEF DESCRIPTION OF THE DRAWINGS

This and other innovative aspects, or specific advantageous embodiments, are set out in the appended claims and its technical features are apparent from the detailed description which follows of a preferred, advantageous embodiment which must, however, be considered purely as a non-limiting example of the invention; the description being made with reference to the accompanying drawings, in which:

DETAILED DESCRIPTION OF PREFERRED EMBODIMENTS OF THE INVENTION

Figure 1:
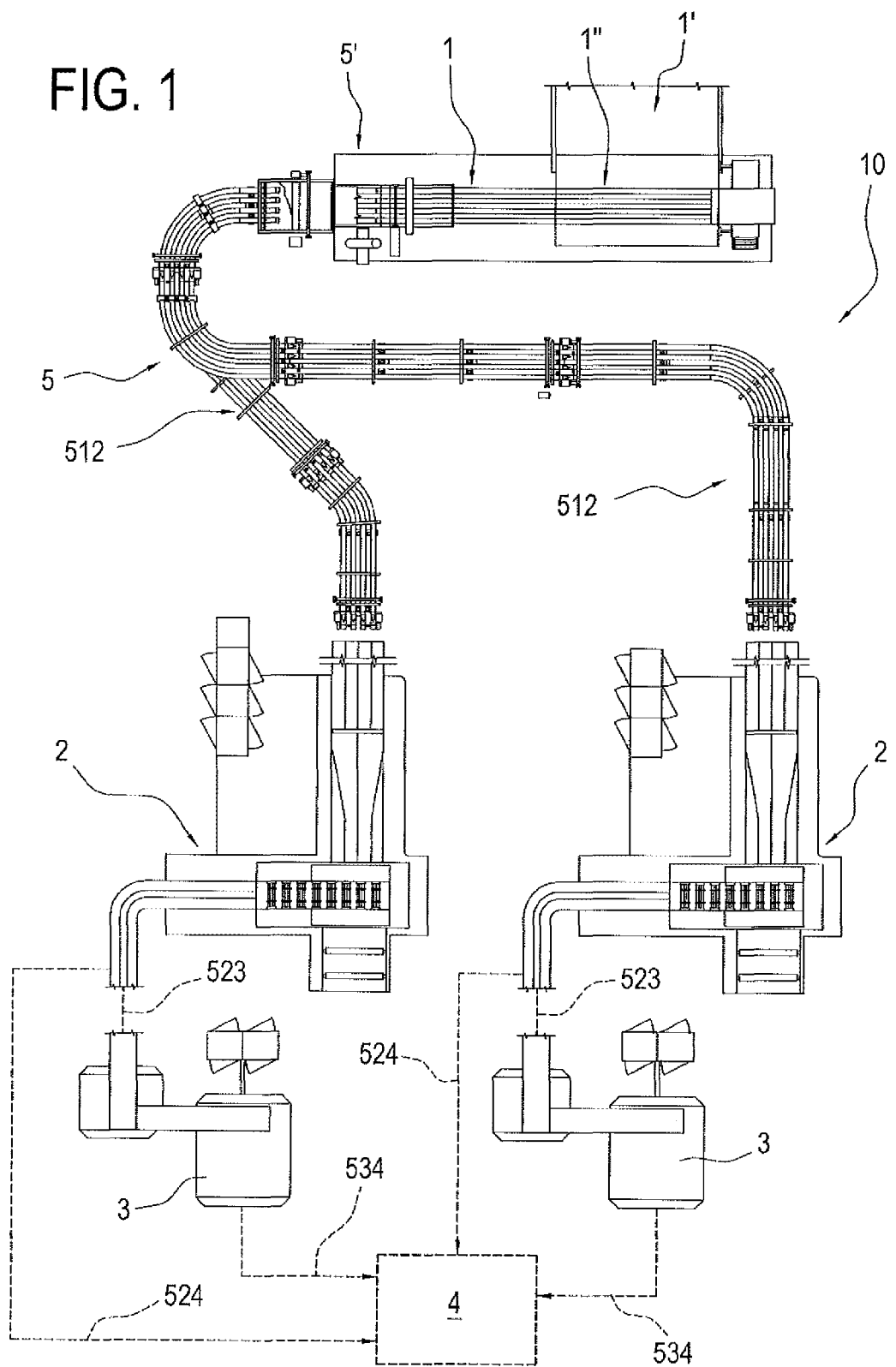
FIG. 1 shows a schematic plan view of a preferred embodiment of the plant of the tissue industry adapted to use a preferred embodiment of a unit for detecting defective products according to this invention.

FIG. 1 illustrates a preferred embodiment 10 of a processing plant, in particular for making respective products, where respective articles packed in respective packages are made.

Preferably, the articles are in the form of articles of the tissue industry, such as rolls, handkerchiefs, hand and face wipes, napkins or the like, made of paper material.

More specifically, the rolls are in the form of rolls of toilet paper and/or kitchen paper.

The packages are in turn preferably in the form of packets, packs, boxes, bags, pallets or other.

More specifically, the plant 10 comprises at least one operating line which includes at least one upstream section 1, for making the articles, in particular in the form of rolls, the upstream section being, in particular in the form of a log saw machine for cutting the rolls from a respective elongate log. As illustrated, the log saw machine comprises means 1' for making the log and means 1" for cutting the rolls from the log.

The plant 10 also comprises at least one packaging section 2, in particular for primary packaging, preferably in the form of a section for packing the articles or rolls, in particular in a respective film, preferably a plastic wrapping film.

More specifically, as illustrated, the example embodiment described herein comprises a first and a second primary packaging section 2, 2, fed by respective conveying sections, or lines, 5.

Downstream of the respective primary packaging section 2, the plant also comprises at least one or more further packaging sections 3 and/or 4.

More specifically, as illustrated, there are means or sections for bagging the packs, namely, a first and a second bagging section 3 downstream of the respective packing machines 2, and an end palletizing section 4 which receives the products through corresponding conveying lines from the respective bagging machine or directly from the respective packing machine 2.

As illustrated, the plant comprises a respective conveying section, or means 5, by which the products are transported between one section of the plant and another, in particular between the means 1 which make the articles and the respective packaging section 2 and/or between one packaging section and another downstream.

More specifically, as illustrated, the conveying means 5 comprise means 512 for conveying the products between the section which makes the articles 1 and the respective packing section 2 and which comprise a respective stage, or apparatus, 5' for directing the flows of articles feeding out of the machine which makes the articles 1 towards corresponding lines leading to the respective packing machines 2, 2.

Also, as illustrated, the conveying means 5 comprise respective conveying means 523 running between the corresponding packing section 2 and the respective bagging section 3, as well as conveying means 534 running between the respective bagging section and the palletizing section 4.

As illustrated, the use of conveying means 524 running between the respective packing section 2 and the palletizing section 4 is also contemplated.

As illustrated, the conveying means comprise a plurality of parallel conveying lines or belts for corresponding pluralities of articles and/or packages. More specifically, as illustrated, four parallel conveyor belt lines are used in the stretches 512 of the conveying means.

Figure 2:
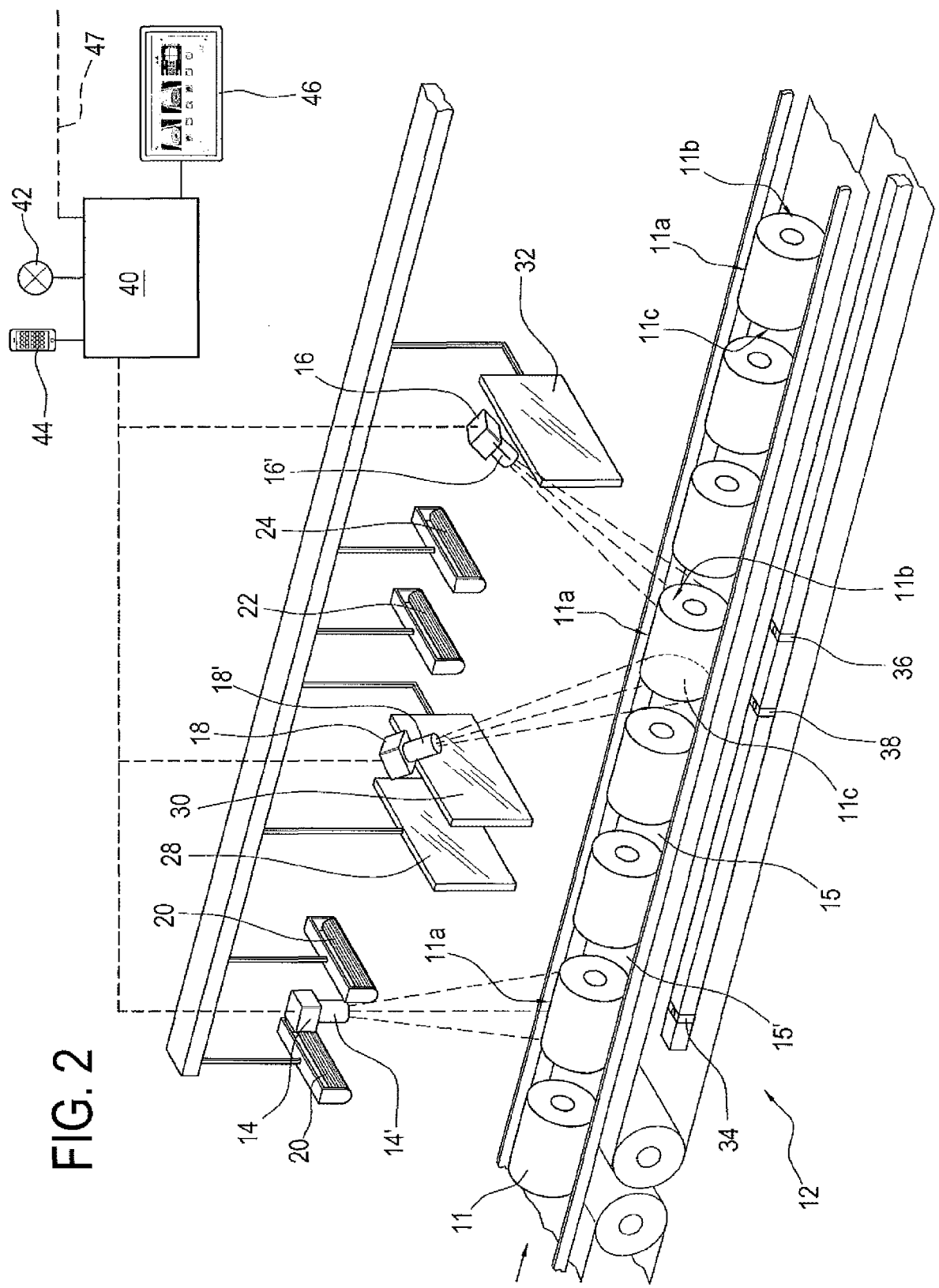
FIG. 2 shows a perspective view of a first preferred embodiment of a unit for the control and management of products and preferably for detecting defective products according to this invention and located along the respective product conveying line.

Advantageously, the plant comprises at least one unit 12, illustrated in FIG. 2, for detecting defective products, in particular for detecting defective articles and/or packages, preferably for detecting defective rolls and/or packs.

By way of example, the unit of the invention is adapted to work with rolls of different sizes, for example rolls whose diameter is preferably between 90 mm and 200 and whose length is preferably between 90 mm and 280 mm.

The unit of the invention is also adapted to work with rolls made of white or coloured paper or paper printed with respective logos, images, designs or decorations.

More specifically, the unit 12 for detecting defective products is advantageously situated at the conveying means of the plant, in particular at the conveying section 512 located between the section 1 which makes the articles, in particular the log saw which cuts off the rolls, and the respective packaging section 2, in particular defined by the corresponding packing machine.

Preferably, the unit of the invention is located at the outfeed of the log saw, or section for making the articles 1.

More specifically, the unit 12 for detecting defective products, might also be located at the respective conveying section 523, 524, downstream of the respective packaging section 2, and/or at the respective conveying section 534, downstream of the respective bagging section 3.

Advantageously, the unit 12 for detecting defective products, comprises means 14, 16, 18 for capturing at least one corresponding image, in particular a plurality of images, of the respective product.

More specifically, the unit 12 for detecting defective products thus advantageously comprises image capturing means embodied by camera means 14, 16, 18 adapted to capture one or more images of the respective product, even in the form of corresponding sequences of images.

More specifically, the camera means are in the form of one or more cameras known as "smart cameras", which comprise respective microprocessor means which allow controlling image capturing and which primarily process the captured images as a function of specific operating needs which will become clearer as this description continues.

Advantageously, therefore, the mode of detecting the product by the camera means 14, 16, 18 can be modified according to specific product image capturing requirements.

Advantageously, therefore, capturing means 14 are provided which are adapted to take snapshots of the product from above in order to obtain or capture at least one image of the top face or surface 11a of the respective product or roll.

It is thus possible to detect corresponding characteristics of the product.

More specifically, capturing images of the product from above allows inspecting the length, width and/or exterior aspect of the corresponding outside surface of the respective product, that is, also the condition or state of the respective end flap of the roll as will become clearer as this description continues.

Also advantageously provided are capturing means 16 which can take snapshots of the product from the front in order to capture at least one corresponding image of the front face 11b of the respective product or roll.

It is thus possible to detect corresponding characteristics of the product, in particular those which can be inferred from its front face.

Also advantageously provided are capturing means 18 which can take snapshots of the product from the back in order to capture at least one corresponding image of the rear face 11c of the respective product or roll.

It is thus possible to detect corresponding characteristics of the product, in particular those which can be inferred from its rear face.

More specifically, as illustrated in FIG. 2, the unit 12 advantageously comprises respective camera means which include a camera 14 located above the means 5 for conveying the product 11 to be detected.

More specifically, the camera 14 has a respective lens 14' which is directed, that is, whose optical axis is directed, perpendicularly or substantially perpendicularly, to the product supporting and transporting surface 15' of the corresponding conveying means 5.

That way, it is particularly easy to take snapshots of the top face of the product, in particular without interfering with the product conveyor, that is to say, without substantially disturbing normal plant operation.

Advantageously, as illustrated, the camera means comprise a corresponding camera and, in particular, a first and a second camera 16, 18, which are respectively located above the product conveying means and, in particular, whose respective lens, or the respective axis thereof, or the respective optical axis thereof, is inclined at a respective angle to the product supporting surface 15' of the conveying means 5.

That way, it is easy to take snapshots of the front and/or rear face of the product, in particular without interfering with the product conveyor, that is to say, without substantially disturbing normal plant operation.

More in detail, the camera means advantageously comprise a corresponding camera 16 whose respective lens 16' is inclined at a respective angle to the product supporting surface 15' of the conveying means 5, the lens 16' being directed in the direction opposite to the product feed direction.

That way, it is easy to take snapshots of the respective front face of the product without substantially disturbing normal plant operation.

Further, as illustrated, the camera means comprise a corresponding camera 18 whose respective lens 18' is inclined at a respective angle to the product supporting surface 15' of the conveying means 5, the lens 18' being directed in the same direction as the product feed direction.

That way, it is easy to take snapshots of the respective rear face of the product without substantially disturbing normal plant operation.

More specifically, as may be inferred from the drawings, the camera means comprise a corresponding camera 14, 16, 18, whose respective lens 14', 16', 18' is positioned at the transverse centre line of the product supporting surface 15' of the conveying means 5, and in particular, at the transverse centre line of the product 11 to be detected.

More specifically, the camera means 14, 16, 18 are advantageously positioned above the conveying means 5 at a distance from the product supporting surface 15' of the selfsame conveying means 5 such that they are higher up than the maximum height of the corresponding product to be detected as it moves along the conveying means 5, or such as to be higher up than the maximum height reachable by a plurality of product types or sizes which can be processed in the plant of the invention.

That means it is advantageously possible to avoid having to adjust the position of the camera means during changeovers.

More specifically, the camera means 14, 16, 18 advantageously have a respective depth of field, that is, a depth or length where the respective image is "in focus", that is to say, a clear image, and which is suitable for detecting a plurality of products of different sizes, in particular different heights and diameters, as they move forward along the conveying means 5. For example, the respective depth of field of the camera means 14, 16, 18 is suitable for taking snapshots of, or keeping in focus, rolls between 90 mm and 200 mm in diameter without carrying out any adjustments.

That way, it is not necessary to adjust the focus of the respective camera means when changing over to products of a different size.

Advantageously, the unit 12 for detecting defective products operates while the products 11 move along the respective conveying means 5, that is to say, while the products are moving forward or performing the respective feed movement.

In practice, the detection means—or camera means—14, 16, 18 operate while the products 11 advance on the respective conveying means 5, that is to say, they capture images of the products while the products are in motion.

In practice, the product or roll, in particular the defective product or roll, is thus eliminated in a particularly rapid manner and without substantially slowing plant operation or the product conveyor system.

More specifically, the unit 12 for detecting defective products operates with products moving forward at a speed of between 235 and 400 rolls per minute.

That way, any defective products can be detected without substantially disturbing normal plant operation and without causing production losses in the plant where the unit is installed.

More specifically, the perpendicular camera 14 is preferably a colour camera, whilst the inclined cameras 16 and 18 are preferably black and white cameras.

It will be understood, however, that the cameras, and corresponding illuminators which are described in more detail below, may be sensitive to electromagnetic radiation in one or more of the infrared, visible or ultraviolet fields.

Advantageously, also, the unit 12 for detecting defective products comprises respective means 20, 20, 22, 24 for lighting the product at the respective detection zone.

That way the product to be detected can be viewed specifically and optimally.

More specifically, the lighting means advantageously comprise a corresponding illuminator, in particular a first and a second illuminator, or lamp, 20, 20, at the respective camera 14 whose lens 14' is directed perpendicularly or substantially perpendicularly to the product supporting surface 15' of the conveying means 5.

That way, the top face of the product to be detected is viewed in optimum manner.

More specifically, the lighting means advantageously comprise a first and a second illuminator, or lamp, 20, 20, which are positioned, along the longitudinal feed direction of the products, upstream and downstream of the respective camera 14 whose lens 14' is directed perpendicularly or substantially perpendicularly to the product supporting surface 15' of the conveying means 5.

Advantageously, the lighting means comprise a corresponding illuminator or lamp, 22, 24, at the respective camera 16, 18 whose lens 16', 18' is inclined to the product supporting surface 15' of the conveying means 5.

That way, the respective transverse, front or rear face of the product to be detected is viewed in optimum manner.

More specifically, as illustrated, the lighting means comprise a corresponding illuminator or lamp, 22, 24, which is advantageously directed towards the respective camera 16, 18 whose lens 16', 18' is inclined to the product supporting surface 15' of the conveying means 5.

Advantageously, as illustrated, the lighting means comprise a corresponding illuminator or lamp, 22, 24, which is positioned along the longitudinal feed direction of the products upstream and downstream of the respective camera at the respective camera 16, 18 whose lens 16', 18' is inclined to the product supporting surface 15' of the conveying means 5.

As illustrated, the lighting means advantageously comprise at least one corresponding illuminator, or lamp, in particular a first and a second illuminator 22, 24, the respective illuminator being positioned along the longitudinal feed direction of the products between the respective cameras 16 and 18 whose respective lenses 16', 18' are inclined to the product supporting surface 15' of the conveying means 5.

Advantageously, the lighting means comprise a corresponding illuminator or lamp, 22, 24, which is located at substantially the same height as the respective camera 16, 18 whose lens 16', 18' is inclined to the product supporting surface 15' of the conveying means 5.

Advantageously, the lighting means then comprise a corresponding elongate illuminator, or elongate lamp, 20, 20, 22, 24 which extends transversely to the longitudinal direction of product feed and positioned centrally relative to the centre line of the conveying means 5, or rather, of the product supporting surface 15' of the conveying means 5.

Particularly advantageously, the lighting means 20, 20, 22, 24 are controlled in such a way as to view or illuminate the product variably, in particular as a function of the specific image to be captured, preferably as a function of the detail of the product to be specifically detected and inspected.

That way, the product is viewed in the optimum manner, in particular allowing its specific, potentially faulty characteristic to be detected.

Also imaginable is the use of distinct illuminators to light different parts of the product to allow taking images or sequences of images of corresponding details of the product.

Advantageously, the unit 12 for detecting defective products comprises means 28, 30, 32 for reflecting the radiation used to light the product, in particular the radiation emitted by the illuminator means 20, 20, 22, 24.

That way, the product to be detected, or rather, the specific zone of the product to be detected, can be viewed in the optimum manner.

More specifically, the means for reflecting the radiation used to light the product advantageously comprise a respective reflecting screen 28 at the camera 14 whose lens 14' is directed perpendicularly or substantially perpendicularly to the product supporting surface 15' of the conveying means 5, the reflecting screen 28 being, in particular, located downstream of the camera 14 along the longitudinal direction of product feed.

As illustrated, the means for reflecting the radiation used to light the product advantageously also comprise a reflecting screen, in particular first and second reflecting screens 30, 32, located, respectively, at the cameras 16, 18 whose lenses 16', 18' are inclined to the product supporting surface 15' of the conveying means 5.

In particular, as illustrated, the respective screen 30 or 32 is located, respectively, upstream or downstream, of the respective camera 16 or 18 along the longitudinal direction of product feed.

More specifically, as illustrated, the respective reflecting screen 30 or 32 is provided on the longitudinal side of the respective camera 16 or 18 opposite the side where the corresponding lighting means 22, 24 are located, being situated, in particular, just behind the respective camera means 16, 18.

Advantageously, the unit 12 for detecting defective products comprises means 34, 36, 38 for activating product detection by corresponding camera means 14, 16, 18.

That way, product detection by the camera means can be activated conveniently and promptly.

Advantageously, the unit 12 for detecting defective products comprises means 34, 36, 38 for activating detection of the respective product by the means 14, 16, 18 for capturing at least one corresponding image of the respective product, in particular by the corresponding camera means 14, 16, 18.

That way, product detection is advantageously activated at exactly the right time and only when strictly necessary.

More specifically, the means for activating product detection comprise sensor means for detecting the presence of the product at the respective detection zone and being, in particular, in the form of photocell means 34, 36, 38.

More specifically, advantageously, the means 34, 36, 38 for activating product detection emit a corresponding signal for activating detection when the product reaches a defined detection zone or when the product leaves a defined detection zone, that is to say, when it covers or uncovers a respective photocell located at the respective detection zone.

More specifically, the means 34, 36, 38 for activating detection are located at the conveying means 5.

More specifically, means 34 are provided for activating detection by the camera 14 whose lens 14' is directed perpendicularly or substantially perpendicularly to the product supporting surface 15' of the conveying means 5 and which are situated at the camera 14 itself and emit a corresponding activation signal when a product reaches the activation means 34 themselves, in particular, when the product is substantially centred longitudinally relative to the camera means 14.

Also provided are means 36 for activating detection by the respective camera 16 whose lens 16' is inclined to the product supporting surface 15' of the conveying means 5, these activating means 36 being situated upstream of the camera 16 itself at the zone of detecting the corresponding transverse face of the product and emitting a corresponding signal for activating the camera 16 when the product reaches the activation means 36 themselves.

Also provided are means 38 for activating detection by the respective camera 18 whose lens 18' is inclined to the product supporting surface 15' of the conveying means 5, these activating means 38 being situated downstream of the camera 18 itself at the zone of detecting the corresponding transverse face of the product and emitting a corresponding signal for activating the camera 18 when the product uncovers, or moves away from, the activation means 38 themselves.

Advantageously, at the unit 12 for detecting defective products, in particular at the means 14, 16, 18 for capturing at least one corresponding image of the respective product, the products are spaced apart along their longitudinal feed direction preferably by a spacing such as to allow capturing a corresponding transverse image, preferably complete, of the respective front and/or rear face of the product.

Advantageously, although not specifically illustrated in the accompanying drawings, the plant of the invention may comprise, upstream of the product detection unit 12, corresponding means for spacing the products being conveyed.

That way, it is possible to detect the product in optimum manner, and in particular to detect the front and rear transverse surfaces of the product.

More specifically, the longitudinal spacing between the products is a function of the dimensions or size of the respective product or roll.

For example, for rolls 110 mm in diameter, the spacing between two consecutive rolls may be between 75 mm and 85 mm.

Advantageously, the unit 12 for detecting defective products comprises electronic processing means, or means for controlling the unit, 40, in particular in the form of an industrial PC provided with corresponding program means or softwarep means.

More specifically, advantageously, the electronic processing means 40 receive data corresponding to at least one image of the respective product from the means for capturing at least one corresponding image of the product, in particular from the camera means 14, 16, 18.

The electronic processing means 40 then process the image and determine whether the product has any defect or defects.

Advantageously, the electronic processing means 40 process the image and determine at least one corresponding parameter representing a particular product characteristic to be assessed.

The electronic processing means 40 then determine whether the product is defective or acceptable by assessing whether the parameter representing a particular characteristic of the product falls outside or inside a defined tolerance range around a predetermined reference value.

The predetermined reference value is determined by processing at least one image of at least one corresponding product whose respective characteristic is optimal or, in any case, compliant with specifications.

Advantageously, the tolerance value around the respective reference value can be selected or set at will, in particular by the operator in charge, for example using an input keyboard forming part of the electronic processing means 40.

For different product characteristics, the electronic processing means 40 might also determine the level of product defectiveness or acceptability on a predetermined scale of values of the parameter representing a particular characteristic of the product.

The level on the predetermined reference scale is distinguished or defined by a corresponding predetermined threshold value.

More specifically, the reference scale might have three different levels, respectively defining a product which is without defects, or substantially without defects, a product which is defective but acceptable and a product which is defective and unacceptable. There might also be a fourth reference level to indicate a severely defective product.

The electronic processing means 40 are also adapted to determine whether the product must be considered defective and non-conforming, or conformant and acceptable by combining together the parameters or scores obtained from the detection of different product defects.

In practice, the parameters or scores obtained from the detection of different product defects are suitably weighted and combined to give a total value or score.

In a preferred embodiment, the total defect score or value is conveniently compared with a predetermined reference value in order to determine whether the product is non-conforming and, for example, must be rejected, or is conformant and, for example, must not be rejected.

More specifically, the "weighting", that is, the value by which the parameter or score of the respective defect is weighted might be greater, i.e. higher, for defects considered particularly serious, such as, for example, dirt on the transverse surface resulting from cutting the roll, or smaller, i.e. lower, for defects considered less serious such as, for example, embossing which is not centred on the outside surface of the roll.

Figure 3:
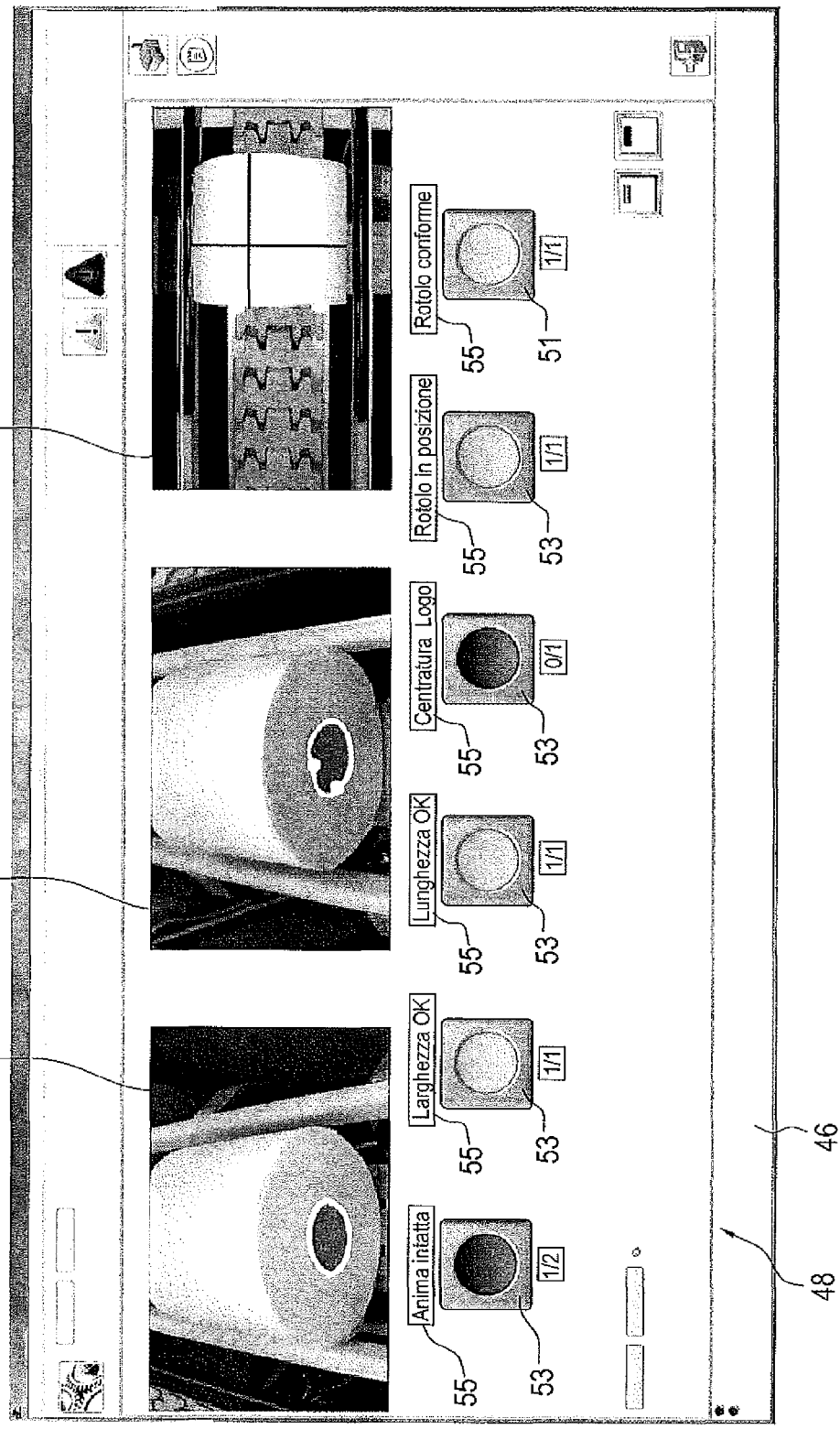
FIG. 3 shows a screenshot of the products being processed.

Advantageously, as may be inferred from FIGS. 2 and 3, the electronic processing means 40 trigger an operator alert procedure if they determine that the respective product is non-conforming.

More specifically, the alert procedure entails issuing a signal, preferably a light signal by means of an alarm lamp 42 at the detection unit 12, and/or a corresponding sound signal.

Advantageously, the electronic processing means 40 also send a corresponding message, in particular, an alarm or detected defect message, to the telephone, in particular, the mobile phone 44, or to another terminal device, in the operator's possession. More specifically, such a message might be sent to the operator only on reaching a predetermined, convenient defectiveness threshold or level, which might be selectively settable, if necessary.

The electronic processing means 40 also trigger a corresponding operator alert procedure through corresponding display means, in particular through the display means 46 of the unit 12 for detecting the defective products.

As may be inferred in particular from FIG. 3, the electronic processing means 40 advantageously cause to be displayed on the respective display means, in particular on the display means 46 of the unit 12 for detecting the defective products, a graphical interface or screen 48, which comprises at least one field 54, 56, 58 showing the respective product image captured by the image capturing means, and more specifically, by the camera means 14, 16, 18.

In practice, advantageously, as shown in FIG. 3, the electronic processing means 40 display on the respective display means, in particular on the display means 46 of the unit 12 for detecting the defective products, a respective graphical interface or screen 48, which comprises a field 54 showing a respective image of the product or roll captured by the camera 14 whose lens 14' is directed perpendicularly or substantially perpendicularly.

Also, advantageously, as shown in FIG. 3, the electronic processing means 40 display on the respective display means, in particular on the display means 46 of the unit 12 for detecting the defective products, a respective graphical interface or screen 48, which comprises a field 56 showing a respective image of the product or roll captured by the camera 16 whose lens 16' is inclined and which captures an image of the front face of the product, and a field 58 showing a respective image of the product or roll captured by the camera 18 whose lens 18' is inclined and which captures an image of the rear face of the same product.

Further advantageously, the electronic processing means 40 display on the respective display means, in particular on the display means 46 of the unit 12 for detecting the defective products, a respective graphical interface or screen 48, which comprises an information field 51 which indicates whether the product is defective or conformant.

Further advantageously, the electronic processing means 40 display on the respective display means, in particular on the display means 46 of the unit 12 for detecting the defective products, a respective graphical interface or screen 48, which comprises one or more information fields 53 which indicate whether a specific characteristic of the product is defective or conformant.

As illustrated, the respective information field 51, 53 may advantageously be of the traffic light type, or of the varying colour type, from green to red, when the product or the specific characteristic thereof is conformant or non-conforming, i.e. defective.

Figure 4:
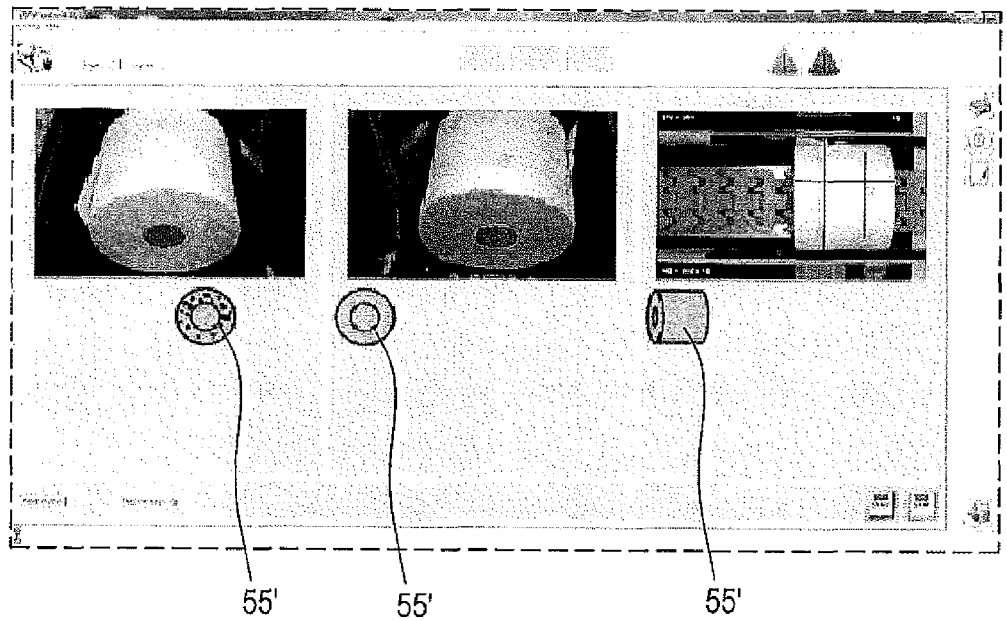
FIG. 4 shows a screenshot of the products being processed, alternative to the screenshot shown in FIG. 3.

Also, as illustrated, the electronic processing means 40 advantageously display at the respective information field 51, 53 a text 55, or possibly a drawing 55' (as shown in FIG. 4), which indicates or highlights the specific aspect or defect or product characteristic the respective information field 51, 53 refers to.

More in detail, the electronic processing means 40 advantageously determine the length and/or the width of the respective product or roll, determining it in particular through an image transmitted by the camera 14 whose lens 14' is directed perpendicularly or substantially perpendicularly, and thus determine whether the length and/or width is non-conforming, i.e. defective, or conformant, i.e. exact.

More specifically, the processing means 40 determine whether the length and/or the width of the respective product or roll falls within a certain tolerance interval, in particular a respective preset value for the specific size of product or roll detected. An example of a roll whose length is non-conforming, as detected by the present defect detection unit 12 and displayed on the respective display means 46, is shown in FIG. 5C.

Advantageously, the electronic processing means 40 determine the state of the outside surface of the product or roll, determining in particular the value of a corresponding parameter, and more specifically, determining it through an image transmitted by the camera 14 whose lens 14' is directed perpendicularly or substantially perpendicularly, and thus determine whether the outside surface is non-conforming, i.e. defective, or conformant. An example of a roll whose outside surface is non-conforming, as detected by the present defect detection unit 12 and displayed on the respective display means 46, is shown in FIG. 5F.

Advantageously, the electronic processing means 40 determine the position of the product or roll, determining in particular the value of a corresponding parameter, and more specifically, determining it through an image transmitted by the camera 14 whose lens 14' is directed perpendicularly or substantially perpendicularly, and thus determine whether the position is defective, i.e. incorrect, or conformant, i.e. correct. More specifically, a roll in an incorrect position might be a roll whose axis is rotated by 90° and whose respective transverse face is resting on the supporting surface 15' of the conveyor 5. An example of a roll whose position is non-conforming or incorrect, as detected by the present defect detection unit 12 and displayed on the respective display means 46, is shown in FIG. 5E.

Advantageously, the electronic processing means 40 determine whether the core of the product or roll is misshapen, determining in particular the value of a corresponding parameter, and more specifically, determining it through an image transmitted by the camera 16, 18 whose lens 16', 18' is inclined, and thus determine whether the core is non-conforming, i.e. defective, or conformant. More specifically, the level on a predetermined graduated scale the respective parameter falls into is determined, the predetermined graduated scale being specific to the respective size of product or roll detected. An example of a roll having a misshapen, non-conforming core, as detected by the present defect detection unit 12 and as displayed on the respective display means 46, is shown in FIG. 5B.

Advantageously, the electronic processing means 40 determine whether the respective transverse face of the product or roll is dirty, determining in particular the value of a corresponding parameter, and more specifically, determining it through an image transmitted by the camera 16, 18 whose lens 16', 18' is inclined, and thus determine whether the transverse face is defective, i.e. dirty, or conformant, i.e. clean or slightly dirty. More specifically, the level on a predetermined graduated scale the respective parameter falls into is determined. An example of a roll having a dirty, non-conforming transverse face, as detected by the present defect detection unit 12 and as displayed on the respective display means 46, is shown in FIG. 5G.

Advantageously, the electronic processing means 40 determine whether the logo or the printed text, design or decoration on the outside surface of the product or roll is correctly positioned or centred, determining in particular the value of a corresponding parameter, and more specifically, determining it through an image transmitted by the respective camera 16, 18 whose lens 16', 18' is inclined, and thus determine whether the centring is non-conforming, i.e. defective, or conformant. More specifically, the processing means determine whether the centring of the logo falls within a certain tolerance interval. An example of a roll where the logo on the outside surface of the product or roll is not correctly positioned or centred, as detected by the present defect detection unit 12 and as displayed on the respective display means 46, is shown in FIG. 5D.

Also, advantageously, the electronic processing means 40 determine whether the printing and embossing on the outside surface of the product are centred.

Advantageously, the electronic processing means 40 also determine whether the winding or rewinding of the product or roll is irregular.

Advantageously, the electronic processing means 40 also determine whether the core of the product or roll is missing.

Advantageously, the electronic processing means 40 also determine whether the end flap of the product or roll is detached or excessively long. An example of a roll having a non-conforming end flap, as detected by the present defect detection unit 12 and as displayed on the respective display means 46, is shown in FIG. 5H.

Figure 5A:
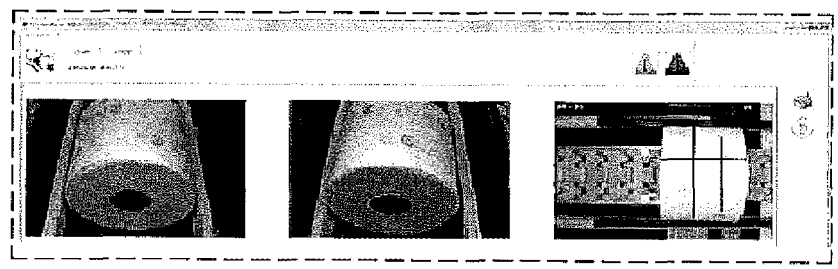
FIGS. 5A to 5H show different configurations of defective products as detected and displayed by the unit of the invention.
Figure 5B:
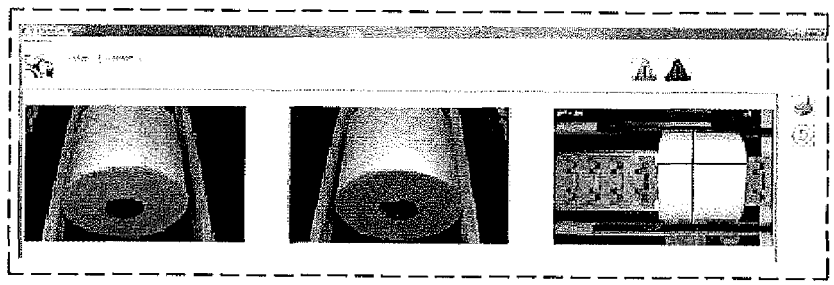
Figure 5C:
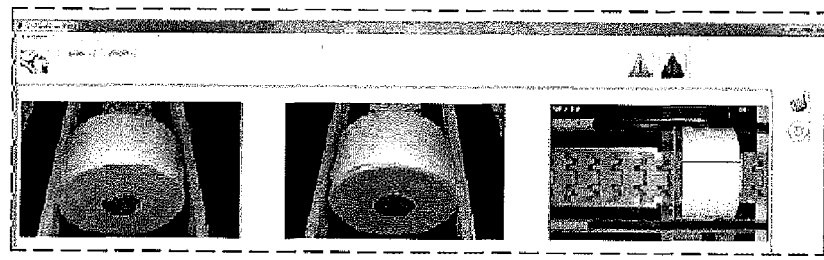
Figure 5D:
Figure 5E:
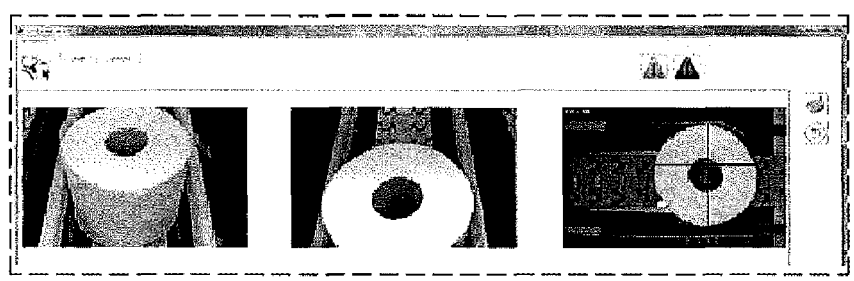
Figure 5F:
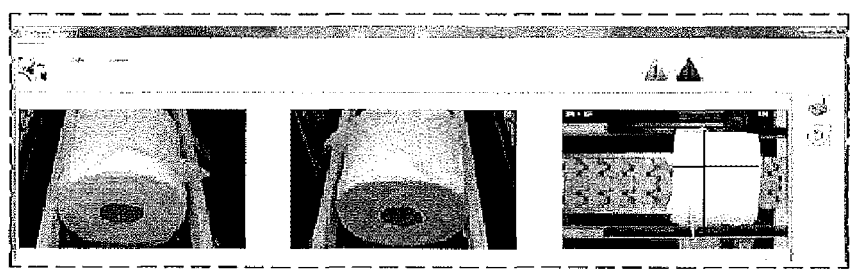
Figure 5G:
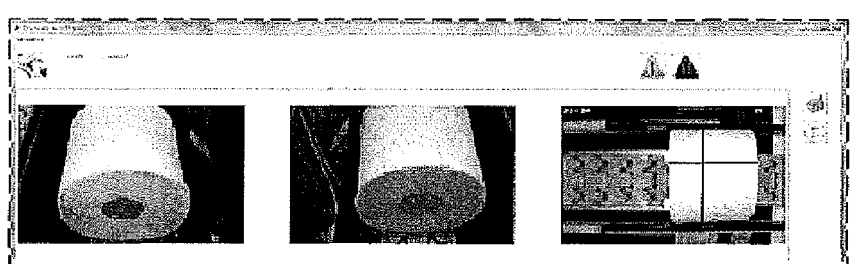
Figure 5H:
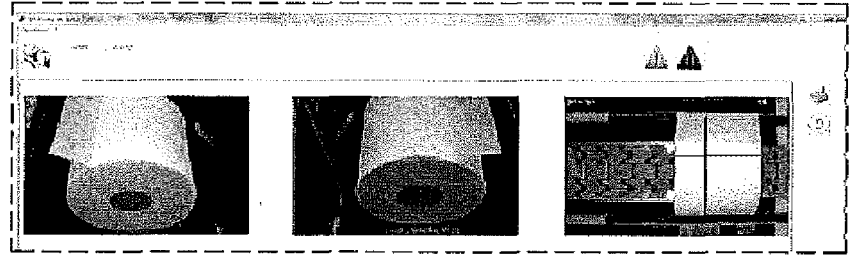

An example of a perfectly conformant roll, as detected by the present defect detection unit 12 and as displayed on the respective display means 46, is shown in particular in FIG. 5A.

Advantageously, the electronic processing means 40 also determine whether the transverse end face of the product or roll after being cut off is oblique.

Advantageously, the electronic processing means 40 provide defect tracking means used, in particular, for statistical purposes.

More specifically, the tracking means are advantageously adapted to count the number of products or rolls inspected and provide a total figure of production defectiveness, as well as the percentage of each single defect.

More specifically, the tracking means are, advantageously, adapted to indicate the type of rolls, the specific production session and the production batch. This data is conveniently stored with, or correlated to, the defects identified More specifically, the tracking means advantageously store the images of the defective products and associate them with the respective production data.

Advantageously, the images of non-defective products can also be taken and sampled, for example for purposes of statistical comparison with the defective products.

To do this, the defect tracking means might also be in the form of file folders, each containing image files of products having a respective defect, accompanied by images of non-defective products and/or a respective table or the like showing, for each defective product detected, the date, time and type of defect detected.

Advantageously, the predetermined reference or threshold values of the graduated scale differ according to the type and/or size of the product to be checked.

Advantageously, the predetermined reference or threshold values of the graduated scale are stored in a respective memory, in particular of the electronic processing means 40 of the unit 12 for detecting defective products and can preferably be called up manually by the operator or set automatically when the corresponding product type and/or size is processed.

Advantageously, also, the electronic processing means 40 are connected, at 47, to the plant control and/or management means.

Advantageously, the plant of the invention includes means for eliminating the defects detected and which might be in the form of means which directly correct, or simply indicate, the cause, upstream, which led to the production of a defective product.

More specifically, the means for eliminating the defects are in the form of means which, after the defects have been detected, send a corresponding signal to the control means of the device of the process machine, or operating section, situated upstream, so that the process in which the defect is produced can be corrected.

Further, the means for eliminating the defects might also be in the form of means for expelling the non-conforming products.

More specifically, the invention might contemplate the provision of a lateral expulsion unit, not illustrated in detail in the accompanying drawings and, for example electropneumatically driven, to expel non-conforming rolls, in conjunction with conveyor belt means and provided with respective control systems.

Figure 6:
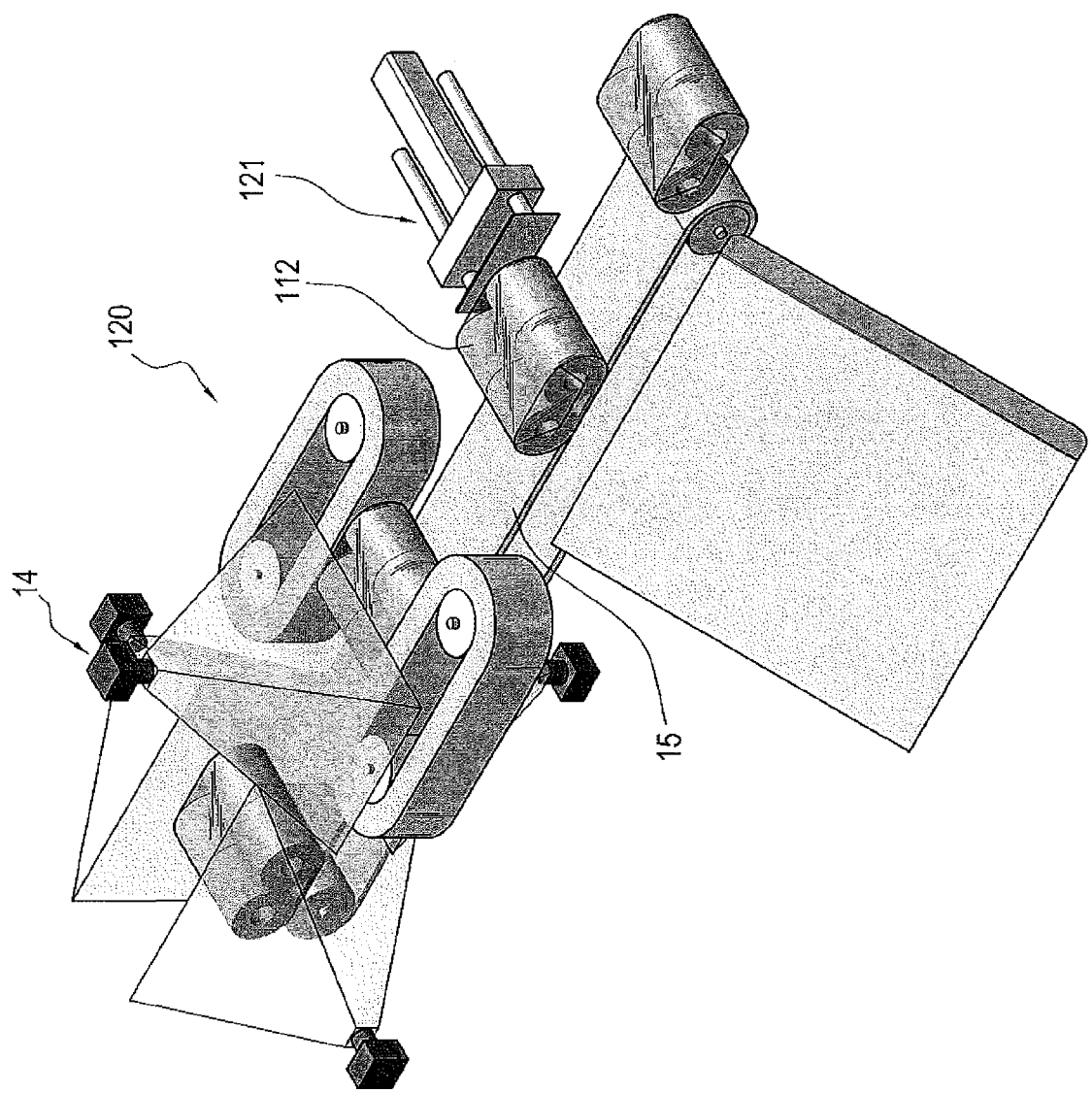
FIG. 6 is a schematic perspective view of a second preferred embodiment of the product detection unit.
Figure 7:
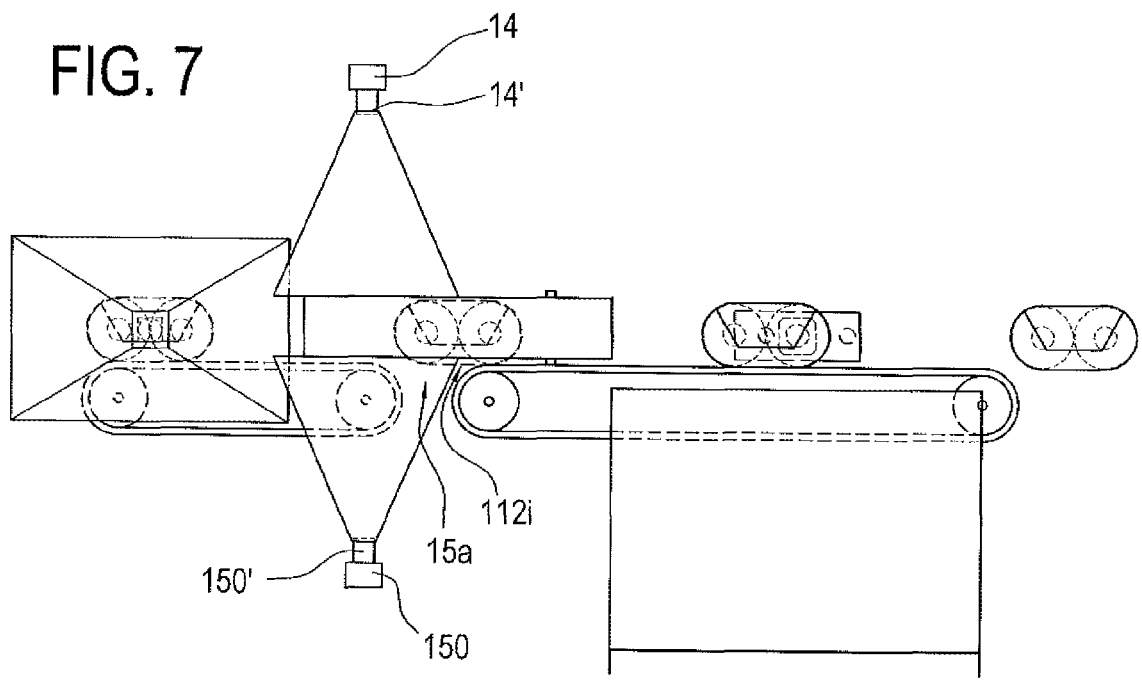
FIG. 7 is a side view of the second preferred embodiment of the unit according to the invention.
Figure 8:
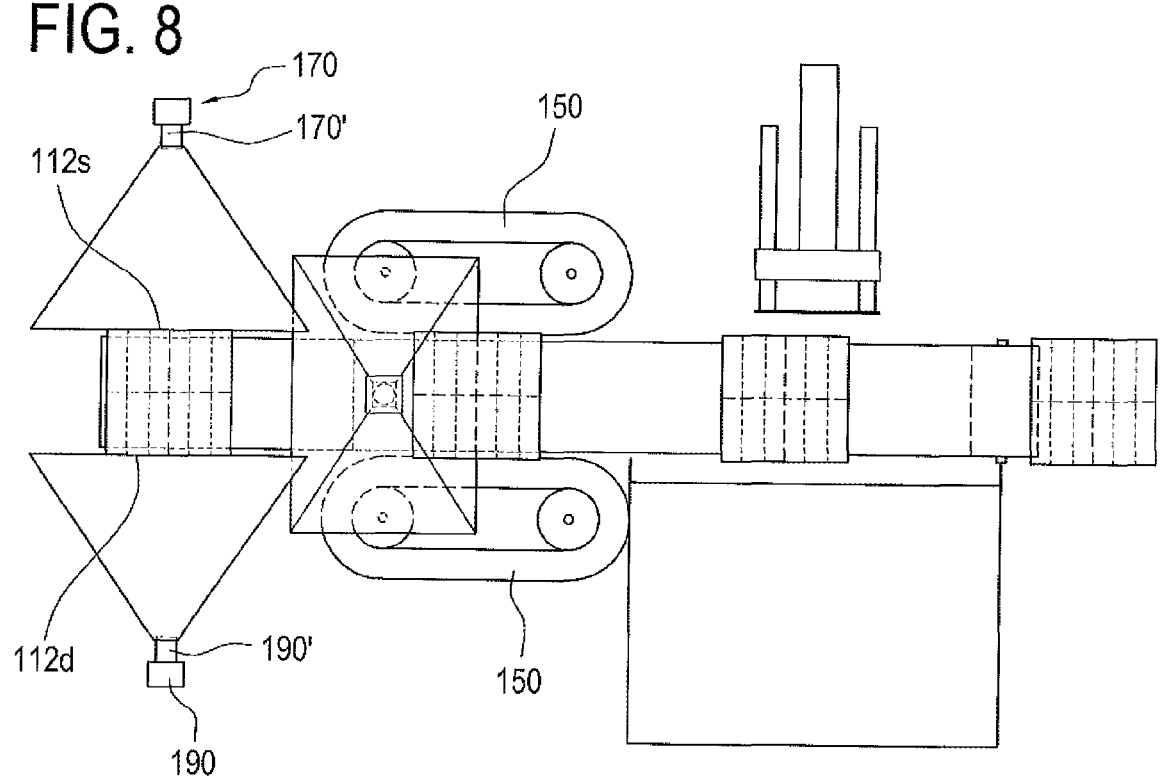
FIG. 8 is a schematic top plan view of the second preferred embodiment of the unit according to this invention.

FIGS. 6 to 8 illustrate a second preferred embodiment 120 of the unit for detecting defective products and which is particularly suitable for detecting corresponding packs of articles, in particular packs of rolls 112.

Figure 9:
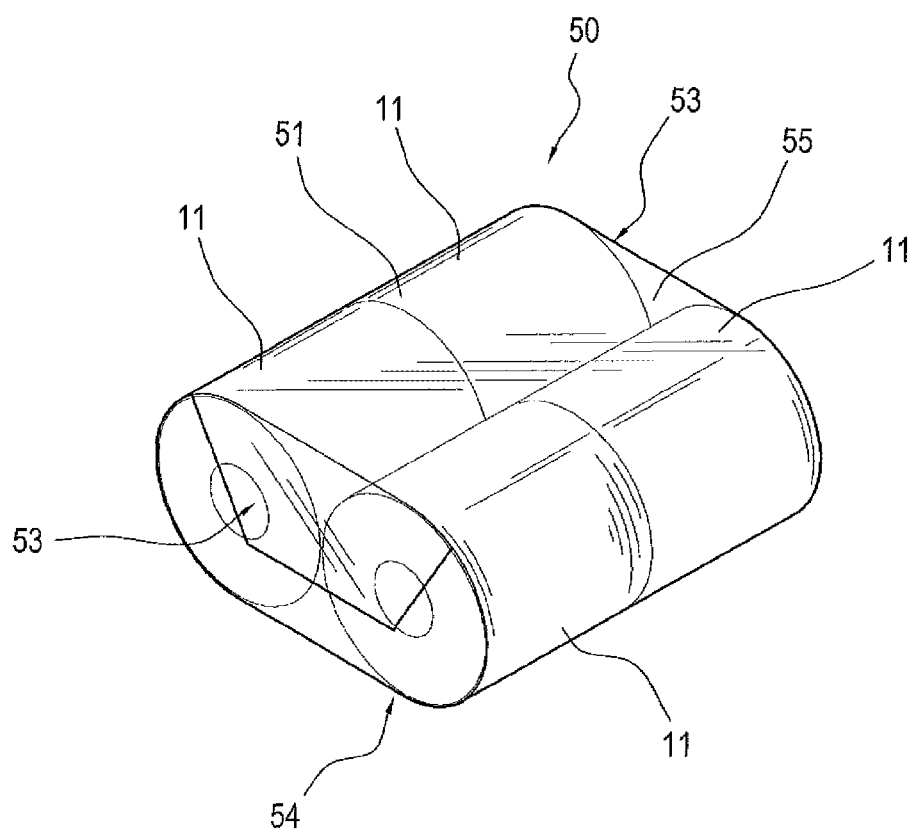
FIG. 9 shows a perspective view of a type of pack which can be processed by this plant.
Figure 10:
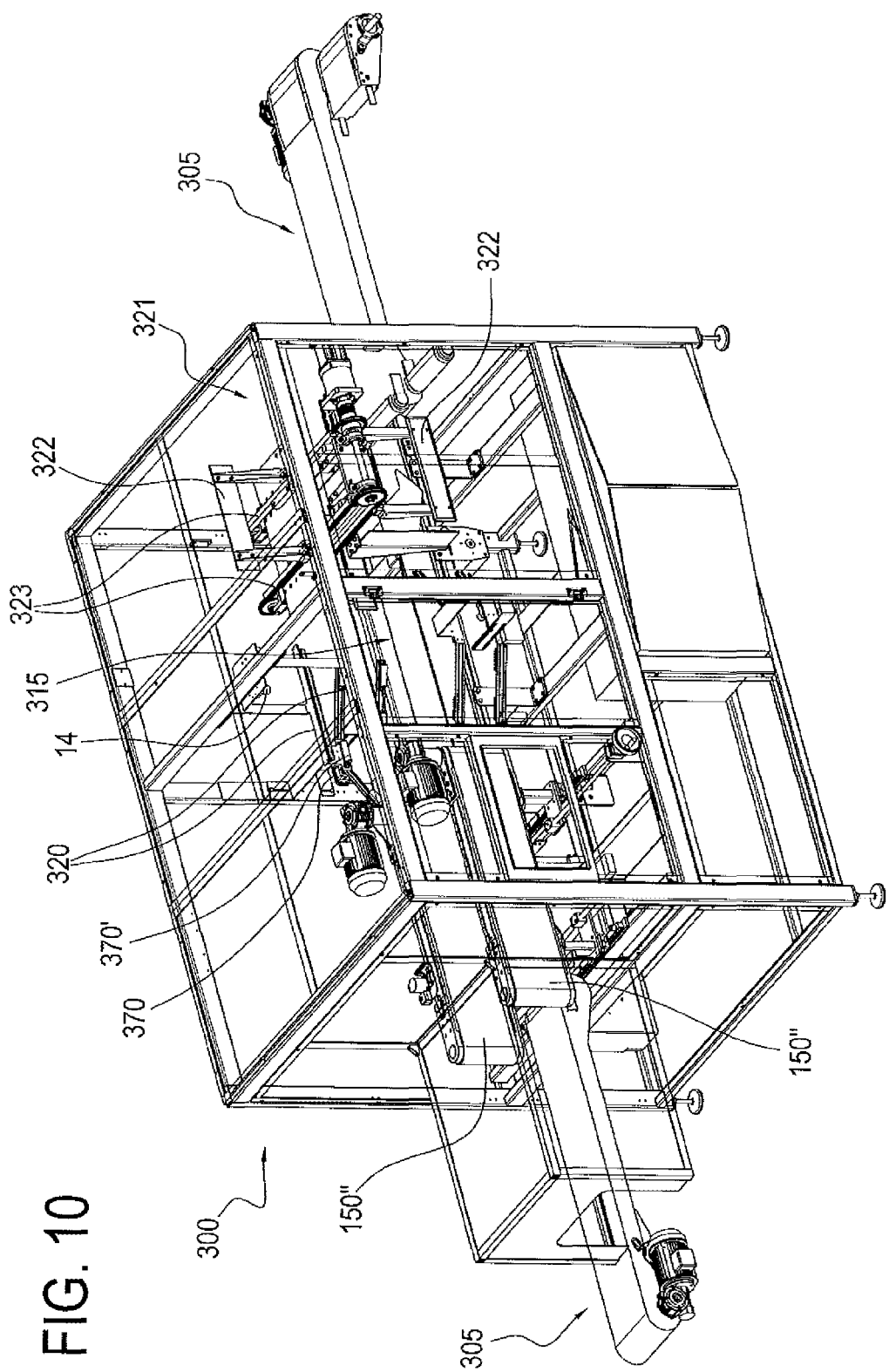
FIG. 10 shows a schematic perspective view of a further preferred embodiment of a unit according to this invention, for the control and management of products, and in particular, of packs.
Figure 11:
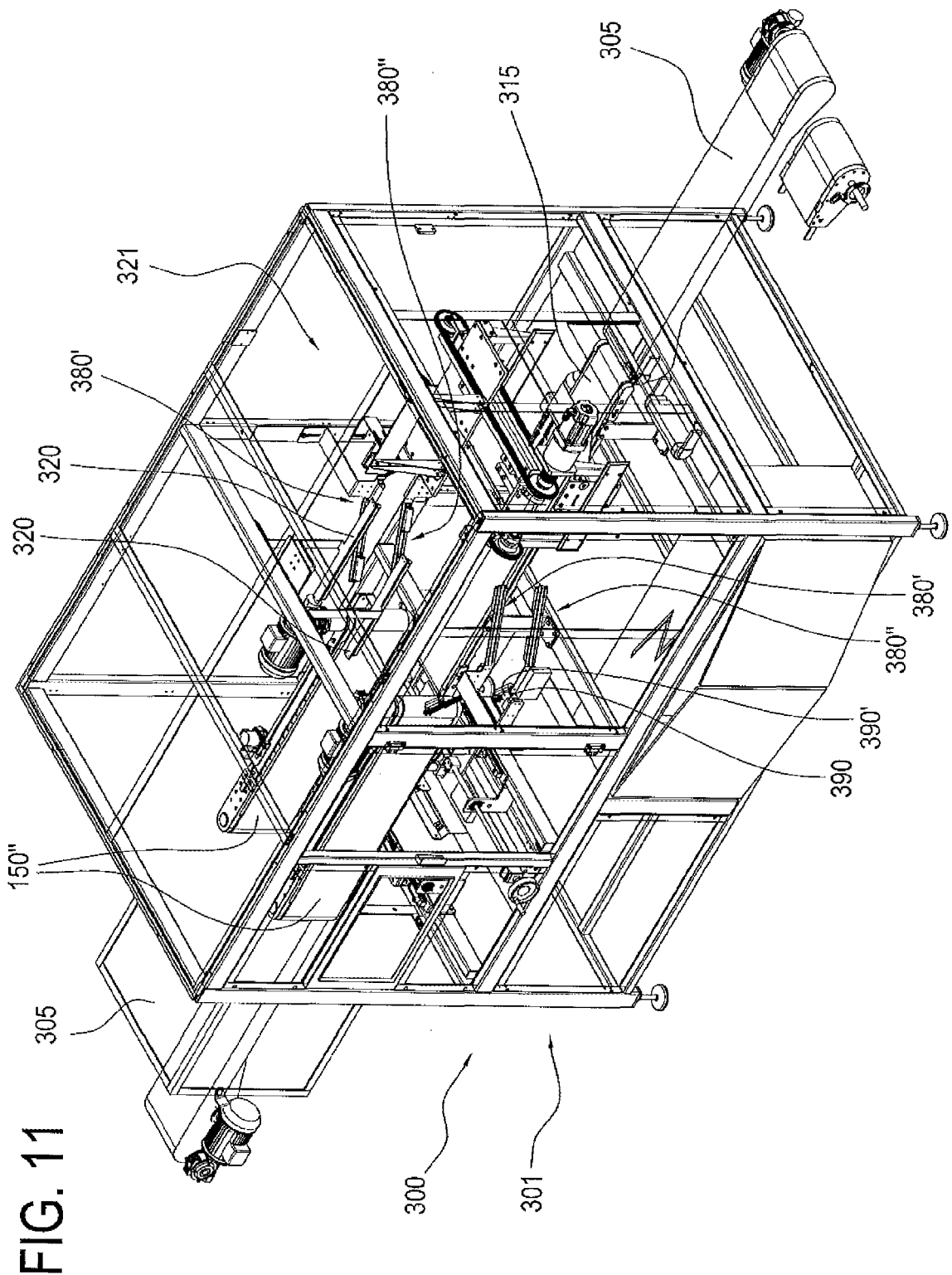
FIG. 11 shows a schematic perspective view of the further preferred embodiment of the unit according to this invention, for the control and management of products, and in particular, of packs, viewed from the opposite side to that of FIG. 10.
Figure 12:
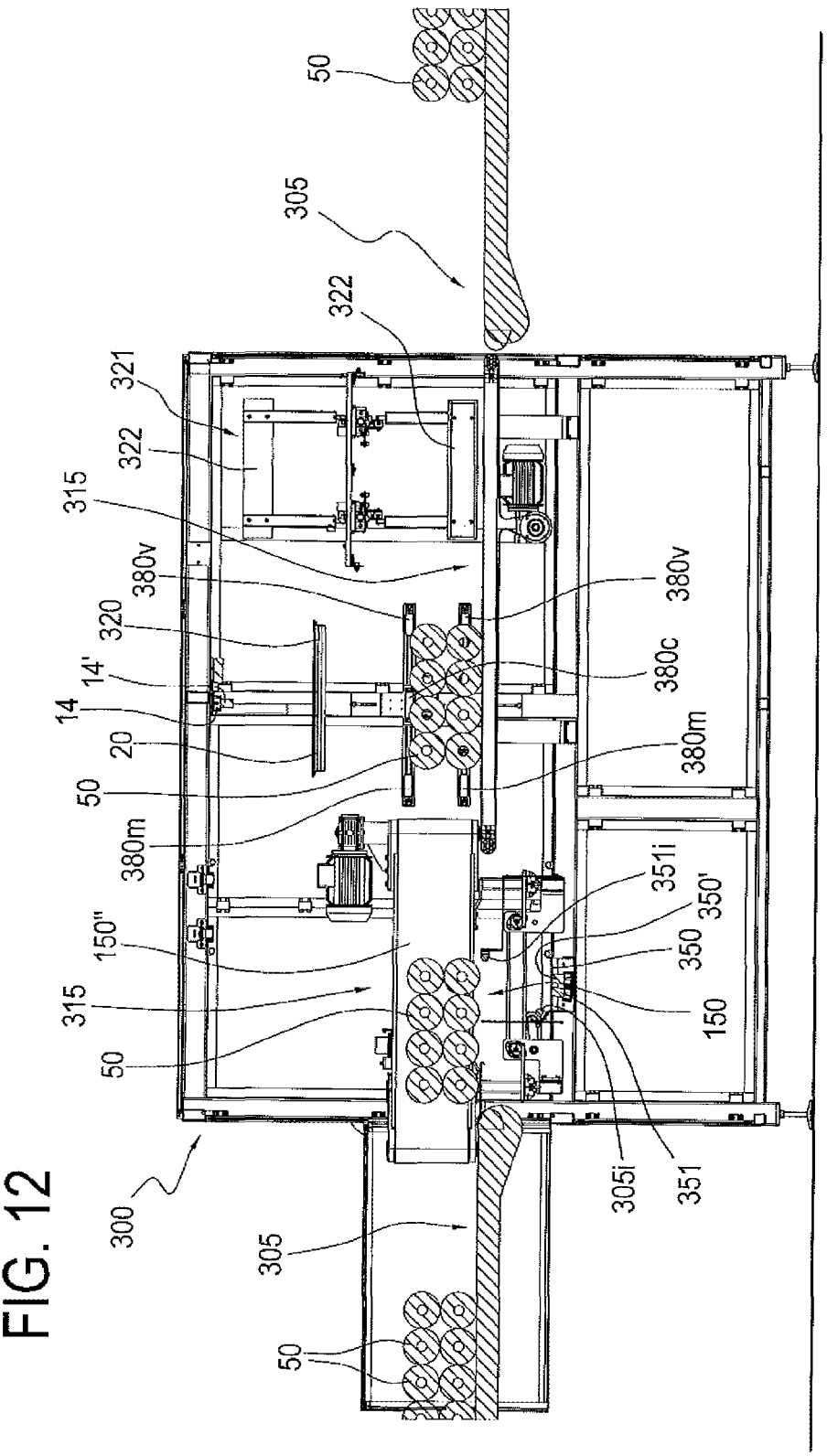
FIG. 12 is a schematic side view of the further preferred embodiment of the unit according to this invention.
Figure 13:
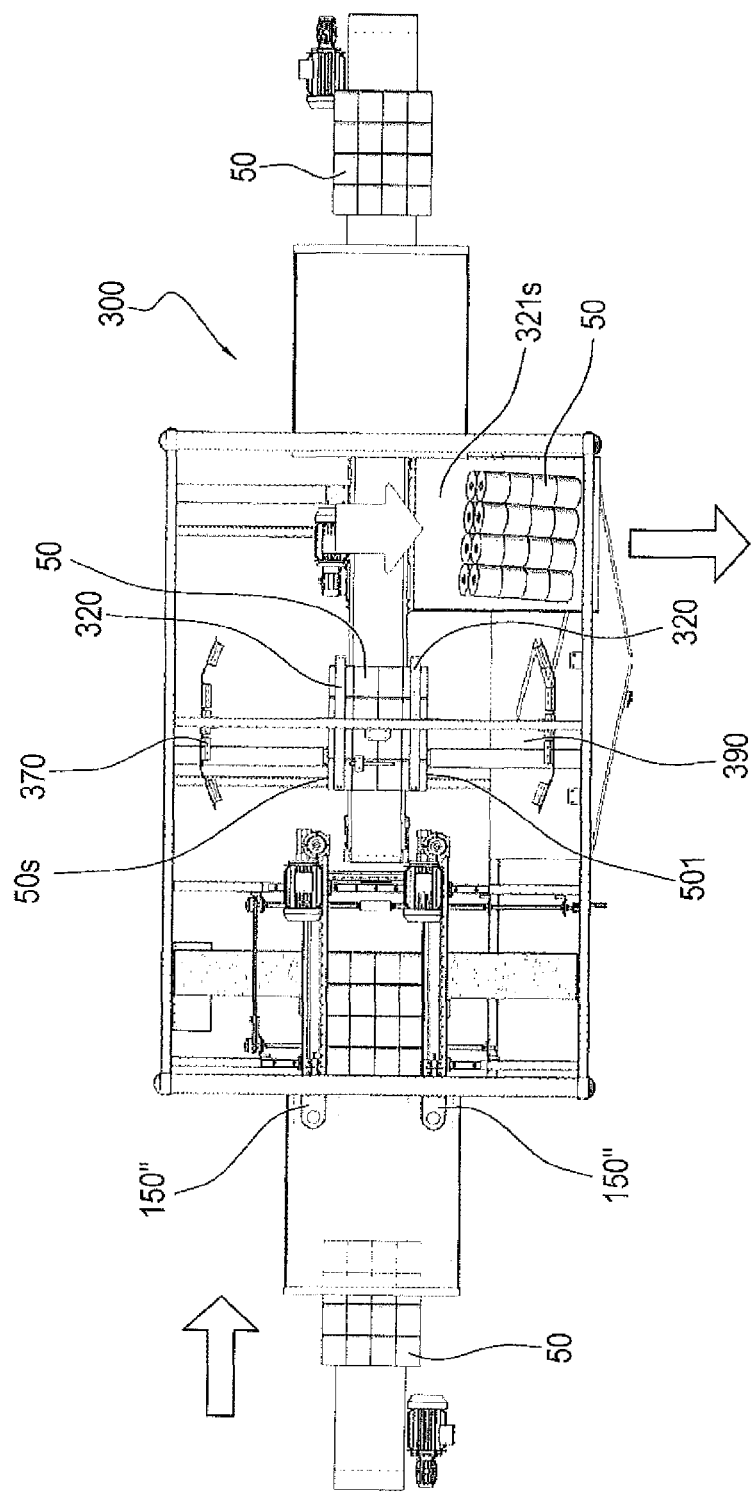
FIG. 13 is a schematic top plan view of the further preferred embodiment of the unit according to this invention.

FIG. 9 shows a preferred or typical embodiment 50 of a pack of rolls 11 which can be processed in the plant of the invention and illustrated, in particular, under normal conveying conditions.

As illustrated, the pack 50 comprises a plurality of rolls 11, suitably positioned and held together by a respective outer wrapper 51, preferably made of plastic material, sealed on its lateral faces 52, 53 and underside face 54, the seal on the underside face being preferably in the form of a transverse seal. Only the seal on the face 53 is shown in FIG. 9. Further, the top face 55 of the pack is normally provided with a trademark or logo and/or other graphical elements. Further graphical elements, for example a barcode, may be provided on the underside face 54 of the product or pack.

Hereinafter, the seals on the lateral faces 52 and 53 of the product or pack are referred as lateral seals and the seal on the underside face 54 of the product or pack, as transverse seal.

The second preferred embodiment 120 comprises means 14 for detection from above which are similar in every way to those of the first preferred embodiment described above and which are not commented on again so as to avoid making this description too lengthy.

The second preferred embodiment 120 of the unit for detecting defective products advantageously comprises image capturing means 150 which are adapted to take snapshots of the product from below in order to capture at least one image of the underside face 112$i$ of the respective product.

It is thus possible to detect corresponding features present on the underside face of the product.

Further advantageously, the second preferred embodiment 120 of the unit for detecting defective products comprises image capturing means 170, 190 which are adapted to take snapshots of the product from a respective side in order to capture at least one image of the corresponding lateral face 112$s$, 112$d$ of the respective product.

More specifically, as illustrated, the image capturing means 170, 190 are adapted to take snapshots of the product from both sides in order to capture at least one image of the corresponding lateral face 112$s$, 112$d$ of the respective product.

It is thus possible to detect corresponding features present on the corresponding lateral face of the product.

The second preferred embodiment 120 of the unit for detecting defective products uses a camera 14 positioned above, whose respective lens 14' is directed perpendicularly or substantially perpendicularly to the product supporting surface 15' of the corresponding conveying means 5 and which is similar in every way to the one of the first preferred embodiment.

Advantageously, in the second preferred embodiment 120, the camera means comprise a corresponding camera positioned laterally of the product conveying means 15, in particular a first and a second camera 170, 190 positioned on opposite sides of the product conveying means 15 and, in particular, whose respective lens 170', 190' is directed parallel or substantially parallel to the product supporting surface 15' of the conveying means 5.

In practice, as illustrated, in the second preferred embodiment, the camera means advantageously comprise a corresponding camera positioned laterally of the product conveying means, in particular a first and a second camera 170, 190 positioned on opposite sides of the product conveying means 15 and, in particular, whose respective lens 170', 190' is positioned at, or substantially at, the perpendicular centre line of the product to be detected.

Advantageously in the second preferred embodiment, the camera means comprise a corresponding camera 150 which is positioned under the product conveying means and, in particular whose respective lens 150' is directed perpendicularly or substantially perpendicularly to the product supporting surface 15' of the conveying means 5, provided downstream, or parallel to the belts 150", 150" which define the opening 15a for viewing the underside of the product.

That way, it is easy to take snapshots of the underside face of the product, in particular without interfering with the product conveyor, that is to say, without substantially disturbing normal plant operation.

More specifically, the camera means advantageously comprise a camera 150 which is positioned under the product conveying means and, in particular, whose lens 150 is positioned at the transverse centre line of the conveying means 5, in particular at the transverse centre line of the product 11 to be detected.

It will be understood, however, that corresponding detection means, in particular of the camera type, similar to the ones denoted by the reference numeral 150 and which take snapshots of the product from below might also be used in the first preferred embodiment described previously.

More specifically, advantageously, the conveying means 5 comprise opening means 15a for detection of the product by the camera 190 positioned below.

More specifically, advantageously, the conveying means 5 comprise, at the opening means 15a, corresponding conveying means, or rotating belts 150", 150" which engage and feed the product forward as it passes by the opening means. As illustrated, the product feed means 150", 150" simultaneously engage the respective product 112 from opposite sides.

More specifically, as illustrated, the top and bottom detection means are situated in a zone of the conveying means which is separate from the zone in which the means for detecting the lateral faces of the product are situated, the means 170, 190, for detecting the lateral faces being, as illustrated, preferably situated in a zone upstream of the zone where both of the cameras 14, 150 with the perpendicularly directed lenses are situated.

According to the second preferred embodiment of the unit for detecting defective products, the corresponding electronic processing means advantageously determine, or are adapted to determine, whether the printing on the wrapper of the product or pack is not centred or well positioned.

In the second, preferred embodiment, the respective electronic processing means also advantageously determine, or are adapted to determine, whether the product or pack, or rather, the related wrapper, is incorrectly sealed.

In the second, preferred embodiment, the respective electronic processing means also advantageously determine, or are adapted to determine, whether the product or pack, or rather, the related wrapper, contains an article that is incorrectly positioned or rotated.

In the second, preferred embodiment, the respective electronic processing means also advantageously determine, or are adapted to determine, whether there is paper trapped in the seal of the product or pack, or rather, of the related wrapper.

In the second, preferred embodiment, the respective electronic processing means also advantageously determine, or are adapted to determine, whether there is a break in the wrapping film (for example, a hole caused by excessive heat during sealing or by tearing).

The unit of the second preferred embodiment in turn comprises respective lighting means, suitably controlled and connected to respective detection or camera means, not illustrated in detail in the accompanying drawings and which may be similar in every way to those described previously in connection with the first preferred embodiment.

Advantageously, the plant includes means for eliminating the defects detected, in particular in the form of means which remove the defective product, such as the ones denoted by the reference numeral 121 in FIG. 3, which eliminate the defective packs from the conveying line, in particular by means of corresponding means for engaging and pushing the product 112 off the conveying line 5.

FIGS. 10 to 14G illustrate a preferred embodiment 300 of a unit or apparatus for the control or management of products, packs in particular, preferably packs of rolls, defined, in particular by packs 50 which, as described above, comprise a plurality of respective articles, in particular rolls 11 suitably positioned and held together by a respective outer wrapper 51, preferably made of plastic material, sealed on its lateral faces 52, 53 and underside face 54, as illustrated in FIG. 9.

As in the first preferred embodiment 12 described above, the further embodiment 300 of the unit for the control and management of products, or packs, is preferably installed in a plant comprising at least one operating line including at least one upstream section for making the articles, in particular in the form of a log saw for cutting rolls off respective elongate logs, at least one respective packaging section, in particular for primary packaging, preferably in the form of a packing section where the articles or rolls are packed and preferably at least one or more further packaging sections, in particular in the form of at least one bagging section where the packs are placed in bags and/or one palletizing section where the packs or bags are placed on pallets.

The plant also comprises a conveying section, or means, by which the products are transported between one section of the plant and another, in particular between the means which make the articles and the respective packaging section and/or between one packaging section and another downstream and further comprises processing means for controlling the functioning of the plant sections. Further, also the unit 300 for controlling and managing products and rolls is equipped with respective processing means for controlling operation, like the first preferred embodiment 12 of the unit.

In this further preferred embodiment 300 of the unit, the components which are similar to those of the preceding preferred embodiments are labelled with the same reference characters and are not commented upon in detail again so as to avoid making this description too lengthy.

The further preferred embodiment 300 of the control unit differs from the first preferred embodiment described above in that it comprises means 321 adapted to eliminate the respective product or pack, in particular defective product or pack 50.

As illustrated, the further preferred embodiment 300 of the control or management unit advantageously comprises a respective frame, or supporting means, 301 which mounts the means 321 for eliminating the respective products or rolls, in particular defective products or rolls 50.

As illustrated, the control or management unit 300 comprises means 305 for conveying the products or packs, in particular in the form of corresponding conveyor belt means, and preferably, a plurality of conveyor belt means.

Advantageously, the means 321 for eliminating the products or packs are in the form of means which remove the respective product or pack 50 from the unit 300, in particular from corresponding conveying means 315 in the zone downstream of the unit 300.

More specifically, the eliminating means 321 are in the form of paddle means 322 which are adapted to move transversely to the longitudinal direction of extension of respective conveying means 315 and which engage a respective pack 50 from the side, moving it transversely off the conveying means 315, in particular onto corresponding unloading means, defined for example by a respective unloading chute 321s.

As illustrated, a first and a second paddle 322, 322 are provided which are mounted, in particular spaced from each other, on shared movement means, especially in the form of endless means 323 which are continuously rotatable in a plane transverse to the conveying direction of the products or packs 50.

The means for removing the product or pack are activated when a respective defective pack is detected by the corresponding computer means for controlling the unit 300 or by those of the plant in which the unit is installed, being activated in particular when a respective defective pack is detected, in order to move the first and second paddles 322, 322 simultaneously.

As illustrated, the paddles 322, 322 are spaced from each other in such a way that a first paddle 322 is located at the conveying means 315, in particular beside these, and then promptly comes into operation on the pack when the signal for removing a defective pack 50 from the conveying means 315 is issued, whilst the other paddle 322 is located above the respective movement means and is adapted to be in turn positioned beside the conveying means 315 after the first paddle 322 has removed the respective defective pack 50 from the line.

More specifically, the further unit 300, like the first and second embodiments of the unit described above, comprises means for detecting defective products which correspond, and are similar in all respects, to those of the first and second embodiments of the unit.

More specifically, in any case, the unit 300 for detecting defective products comprises means for capturing a corresponding image, in particular a plurality of images, of the respective product or pack.

More specifically, the unit 300 for detecting defective products comprises camera means for capturing one or more images, of the respective product or pack and which are adapted to take snapshots of the top, underside and sides of the respective product or pack, as set out in the second preferred embodiment described above.

Further advantageously, the unit 300 might imaginably be provided with detection means which are also adapted to take snapshots of the front and rear of the product or pack, in the same way as in the first preferred embodiment described above.

Advantageously, also, the unit 300 for detecting defective products comprises respective means for lighting the product at the respective detection zone.

That way the product to be detected can be viewed specifically and optimally.

As illustrated, the further preferred embodiment 300 of the unit for detecting defective products, like the second preferred embodiment 120 of the unit, described above, is particularly suitable for detecting corresponding packs of articles, in particular packs of rolls.

Advantageously, as will become clearer as this description continues, the unit 300 comprises means for detecting and/or lighting a respective face of the product or pack and which are adapted, or suitable, for producing different images of the respective product face, in particular which exhibit different states of reflection of the light that is incident upon the respective product face.

More specifically, to detect the respective face of the product or pack, one or more cameras and one or more illuminators are used.

Advantageously, as will become clearer as this description continues, to detect the respective face of the product or pack, a plurality of cameras are used which, in particular have respective lenses which are directed or inclined along different directions relative to the corresponding face of the product or pack to be detected.

Advantageously, as will become clearer as this description continues, to detect the respective face of the product or pack, a plurality of illuminators are used which are directed or inclined and/or positioned differently relative to the corresponding face of the product or pack to be detected and/or directed or inclined and/or positioned differently relative to respective detecting cameras.

Like the second preferred embodiment 120, the further preferred embodiment 300 comprises means 14 for detection from above which are similar in every way to those of the first preferred embodiment described above and which are not commented on again so as to avoid making this description too lengthy.

More specifically as illustrated in the drawings, the unit 300 thus advantageously comprises camera means which include a camera 14 positioned above the means 315 for conveying the product to be detected and, in particular, having a respective lens 14' which is directed, that is, whose optical axis is directed, perpendicularly or substantially perpendicularly, to the product supporting and transporting surface of the corresponding conveying means 315 and/or to the opposing face of the product or pack to be detected.

That way, it is particularly easy to take snapshots of the top face of the product, in particular without interfering with the product conveyor, that is to say, without substantially disturbing normal plant operation.

More specifically, lighting means are advantageously provided which comprise a corresponding illuminator, in particular a first and a second illuminator, or lamp, 320, 320, at the respective top camera 14 whose lens 14' is directed perpendicularly or substantially perpendicularly to the product supporting surface of the conveying means 315, the illuminators 320, 320 being positioned under the camera 14, laterally thereof and extending longitudinally, that is, along the direction of product feed on the respective conveying means.

That way, the top face of the product to be detected is viewed in optimum manner.

More specifically, the lighting means advantageously comprise a first and a second illuminator, or lamp, 320, 320, which are positioned, along the direction transverse to the conveying direction, laterally and downstream of the respective camera 14 whose lens 14' is directed perpendicularly or substantially perpendicularly, and centred or substantially centred, to the product supporting surface of the conveying means 315.

Like the second preferred embodiment described above, the further preferred embodiment 300 of the unit for detecting defective products advantageously comprises image capturing means 350, 351 which are adapted to take snapshots of the product from below in order to capture at least one image of the underside face of the respective product or pack.

It is thus possible to detect corresponding features present on the underside face of the product or pack.

More specifically, advantageously, the conveying means 315 comprise opening means for detection of the product by the corresponding camera 350, 351 positioned below.

More specifically, advantageously, the conveying means 315 comprise, at the opening means 15a, corresponding conveying means, or rotating belts 150", 150" which engage and feed the product forward as it passes by the opening means 15a. As illustrated, the product feed means 150", 150" simultaneously engage the respective product 50 from opposite sides.

More specifically, as illustrated, the detection means for taking snapshots of the product from below comprise a first and second camera 350, 351.

More specifically, the detection means for taking snapshots of the product from below comprise a first camera 350, in particular a colour camera and, in particular, whose lens 350' is directed perpendicularly, or substantially perpendicularly, to the underside surface of the product or pack.

More specifically, the detection means for taking snapshots of the product from below comprise a second camera 351, in particular a black and white camera and, in particular, whose lens 351' is inclined at an angle to the direction which is perpendicular, or substantially perpendicular, to the underside surface of the product or pack, that is, inclined at an angle to the direction in which the lens 350' of the first camera is directed.

Preferably, the first and second cameras 350, 351 for detecting the product from below do not capture product images simultaneously and operate with respective lighting means 350i and 351i.

More specifically, advantageously, lighting means are provided for the means which take snapshots of the product from below, the lighting means comprising a corresponding first and second illuminator or lamp 350i, 351i at the zone of the respective camera 350, 351, the illuminators 350i, 351i extending transversely to the direction of product feed on the respective conveying means.

More specifically, the first illuminator 350i illuminates the product to allow a snapshot of the product to be taken by the first camera 350 whose lens 350' is directed perpendicularly The first illuminator 350i is situated just above and upstream of the corresponding camera 350 and is directed at an angle to the direction which is perpendicular, or substantially perpendicular, to the underside surface of the product or pack, that is, inclined at an angle to the direction in which the lens 350' of the first camera is directed.

The second illuminator 351i in turn illuminates the product to allow a snapshot of the product to be taken by the second camera 351 whose lens 351' is inclined.

The second illuminator 351i is situated very close to the product to be detected, in particular in proximity to or at the underside surface of the product 50.

That way, the respective underside face of the product to be detected is viewed in optimum manner.

More specifically, advantageously, the first illuminator 350i is located, in the direction of product feed, upstream of the respective first camera 350, and also upstream of the second camera 351, with inclined optical axis, whilst the second illuminator 351i is located, in the direction of product feed, downstream of the respective second camera 351, and also upstream of the first, camera 350.

That way, it is easy to take snapshots of the underside face of the product, in particular without interfering with the product conveyor, that is to say, without substantially disturbing normal plant operation.

The further preferred embodiment 300 of the unit for detecting defective products also comprises image capturing means 370, 390 which are adapted to take snapshots of the product from a respective side in order to capture at least one image of the corresponding lateral face 50s, 50d of the respective product or pack.

More specifically, as illustrated, the image capturing means 370, 390 are adapted to take snapshots of the product from both sides in order to capture at least one image of the corresponding lateral face 50s, 50d of the respective product or pack.

Advantageously, in the second preferred embodiment 300, the camera means comprise a first and a second camera 370, 390 positioned on opposite sides of the product conveying means 315, and, in particular, whose respective lens 370', 390' is directed parallel or substantially parallel to the product supporting surface of the conveying means 315 and perpendicular to the corresponding lateral surface of the product or pack.

In practice, as illustrated, in this second preferred embodiment, the camera means advantageously comprise a corresponding camera positioned laterally of, and at a level above, the product conveying means 315, in particular a first and a second camera 370, 390 positioned on opposite sides of the product conveying means 315.

More specifically, advantageously, lighting means are provided for the means which detect the lateral face of the product, these lighting means comprising respective first and second batteries of illuminators 380', 380" located above and below the respective camera means 370 and 390.

More specifically, the first and second batteries of illuminators 380 comprise illuminators 380c on the same side, in the transverse direction, as the respective cameras 370 and 390, that is on the same side as the respective cameras 370, 390 which are directed substantially perpendicularly to the corresponding lateral surface of the product or pack, and illuminators 380m, 380v on one side, or as illustrated, on both sides, of these lateral camera means 370, 390 directed along a respective and/or opposite angle to the corresponding lateral surface of the product or pack.

It is thus possible to detect corresponding features present on the lateral face of the product or pack.

Advantageously, the unit 300 for detecting defective products comprises electronic processing means, in particular in the form of an industrial PC provided with corresponding program means or software means.

More specifically, advantageously, the electronic processing means receive data corresponding to at least one image of the respective product or pack from the means for capturing at least one corresponding image of the product, in particular from the camera means.

The electronic processing means then process the image and determine whether the product has any defect or defects.

Advantageously, the electronic processing means process the image and determine at least one corresponding parameter representing a particular product characteristic to be assessed.

The electronic processing means then determine whether the product is defective or acceptable by assessing whether the parameter representing a particular characteristic of the product falls outside or inside a defined tolerance range around a predetermined reference value, operating in particular in substantially the same way as described in connection with the first preferred embodiment.

The predetermined reference value is determined by processing at least one image of at least one corresponding product whose respective characteristic is optimal or, in any case, compliant with specifications.

The electronic processing means also trigger a corresponding operator alert procedure through corresponding display means, in particular through the display means 346 of the unit 300 for detecting the defective products.

Figure 14A:
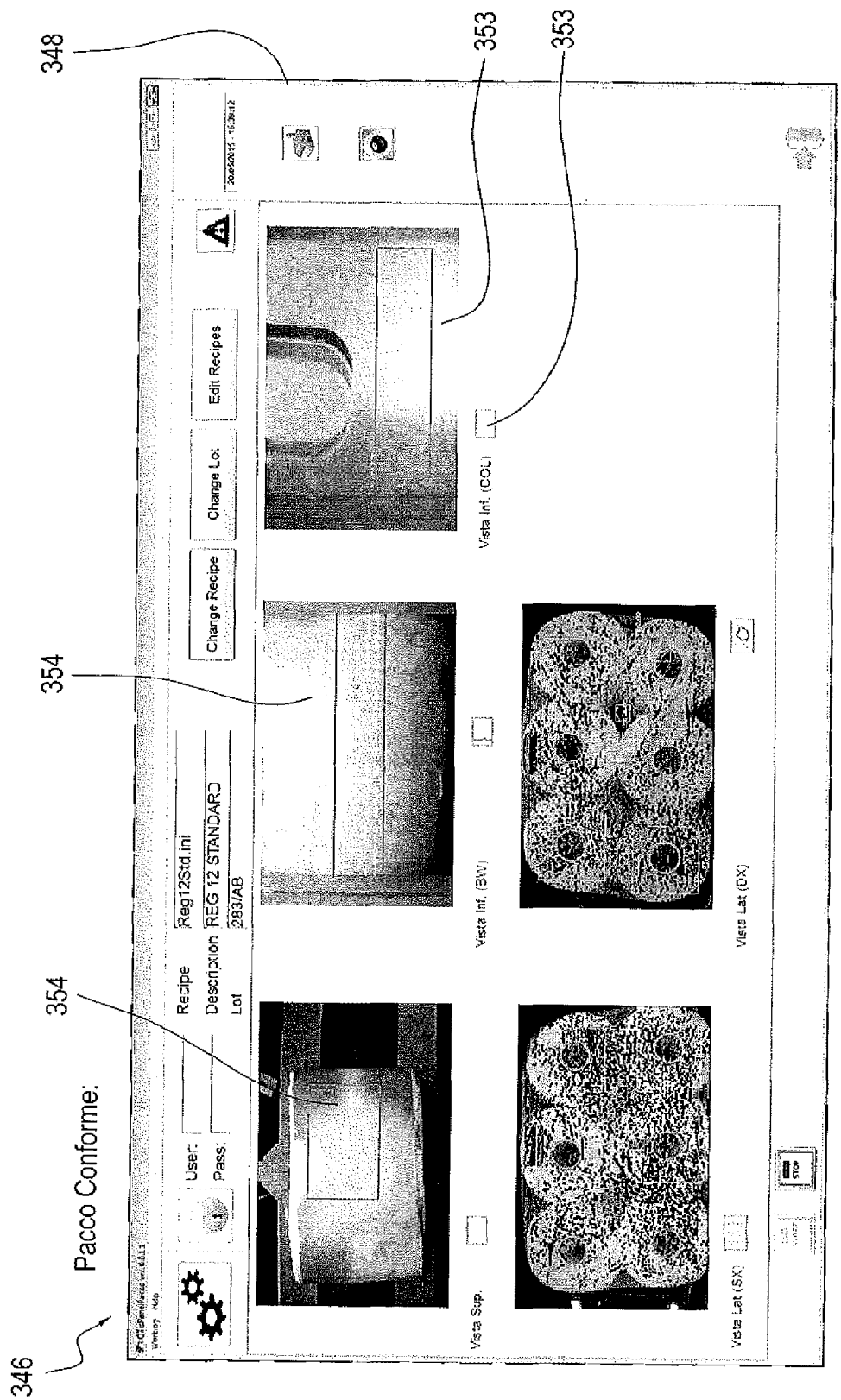
FIGS. 14A to 14G show different configurations of products, in particular defective products, as detected and displayed by the further preferred embodiment of the unit.

As may be inferred in particular from FIG. 14A, the electronic processing means advantageously cause to be displayed on the respective display means, in particular on the display means 346 of the unit 300 for detecting the defective products, a graphical interface or screen 348, which comprises at least one field 354, in particular a plurality of fields, showing the respective image of the product or pack, captured by the image capturing means, and more specifically, by the camera means.

Further advantageously, the electronic processing means display on the respective display means, in particular on the display means 346 of the unit 300 for detecting defective products, a respective graphical interface or screen 348, which comprises one or more information fields 353 which indicate whether a specific characteristic of the product is defective or conformant.

More specifically, FIG. 14A illustrates a screenshot showing a pack which is conformant. The conformant pack is, obviously, not subjected to any action, other than detection, by the unit 300.

Figure 14B:
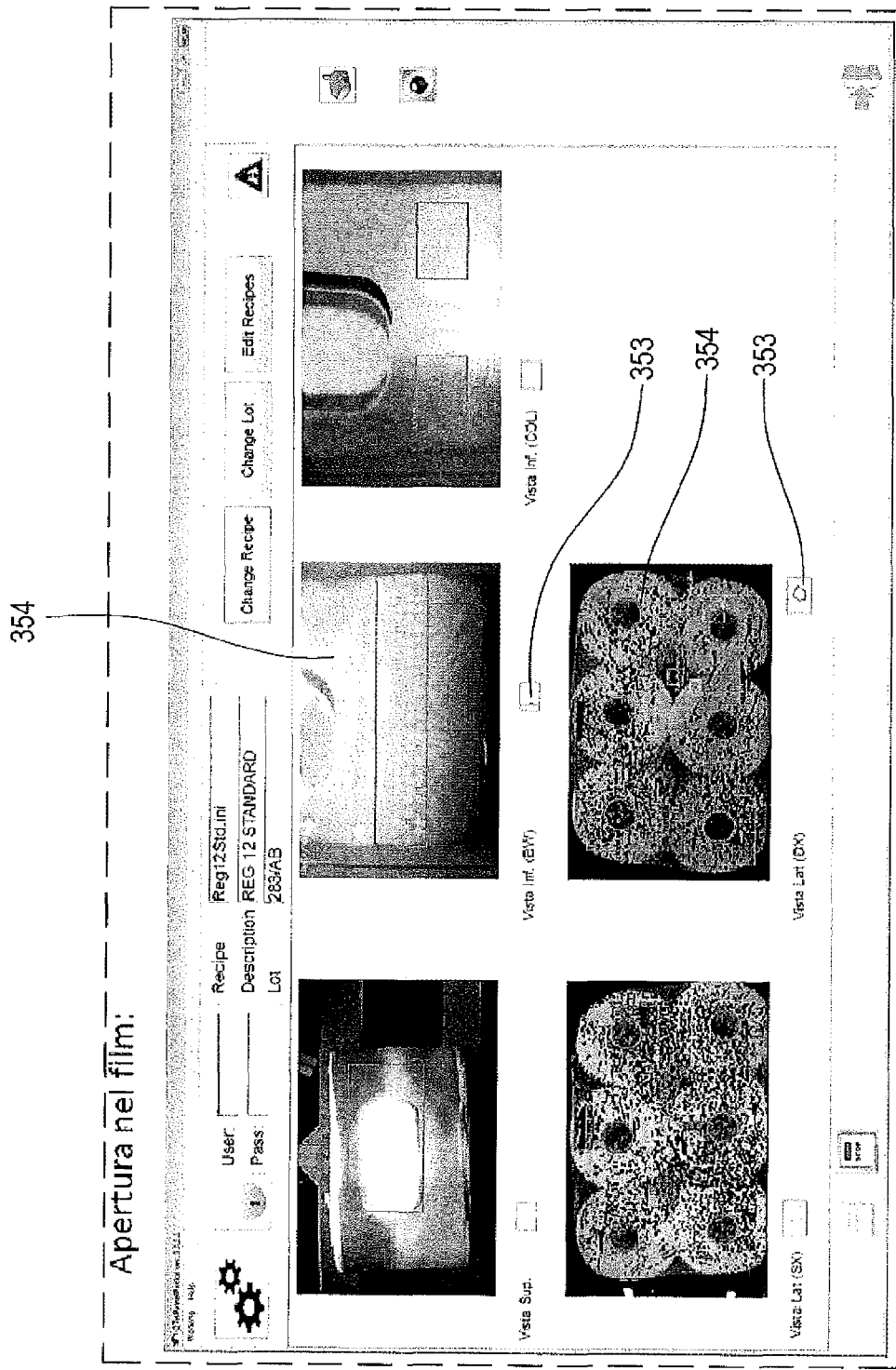
Figure 14C:
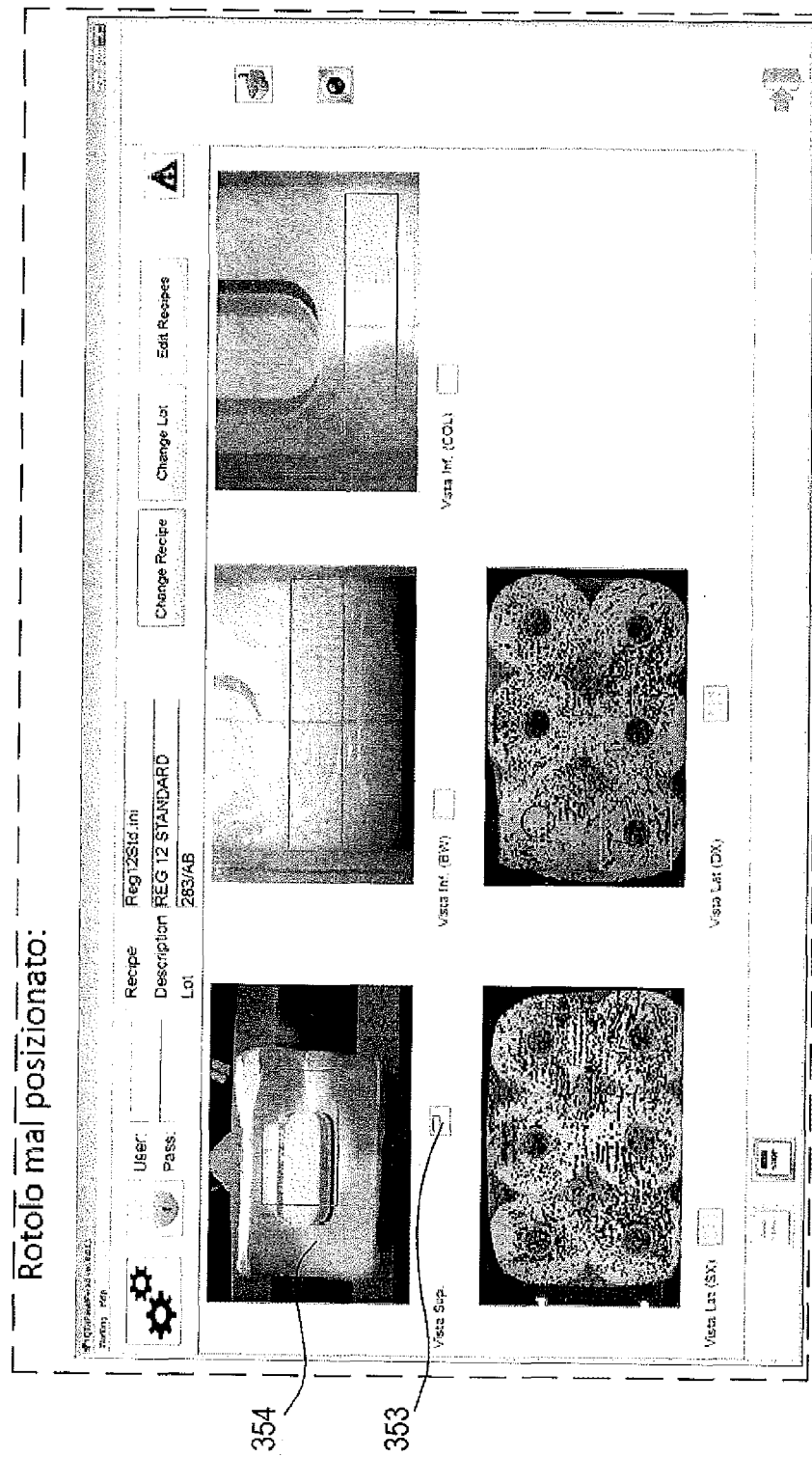
Figure 14D:
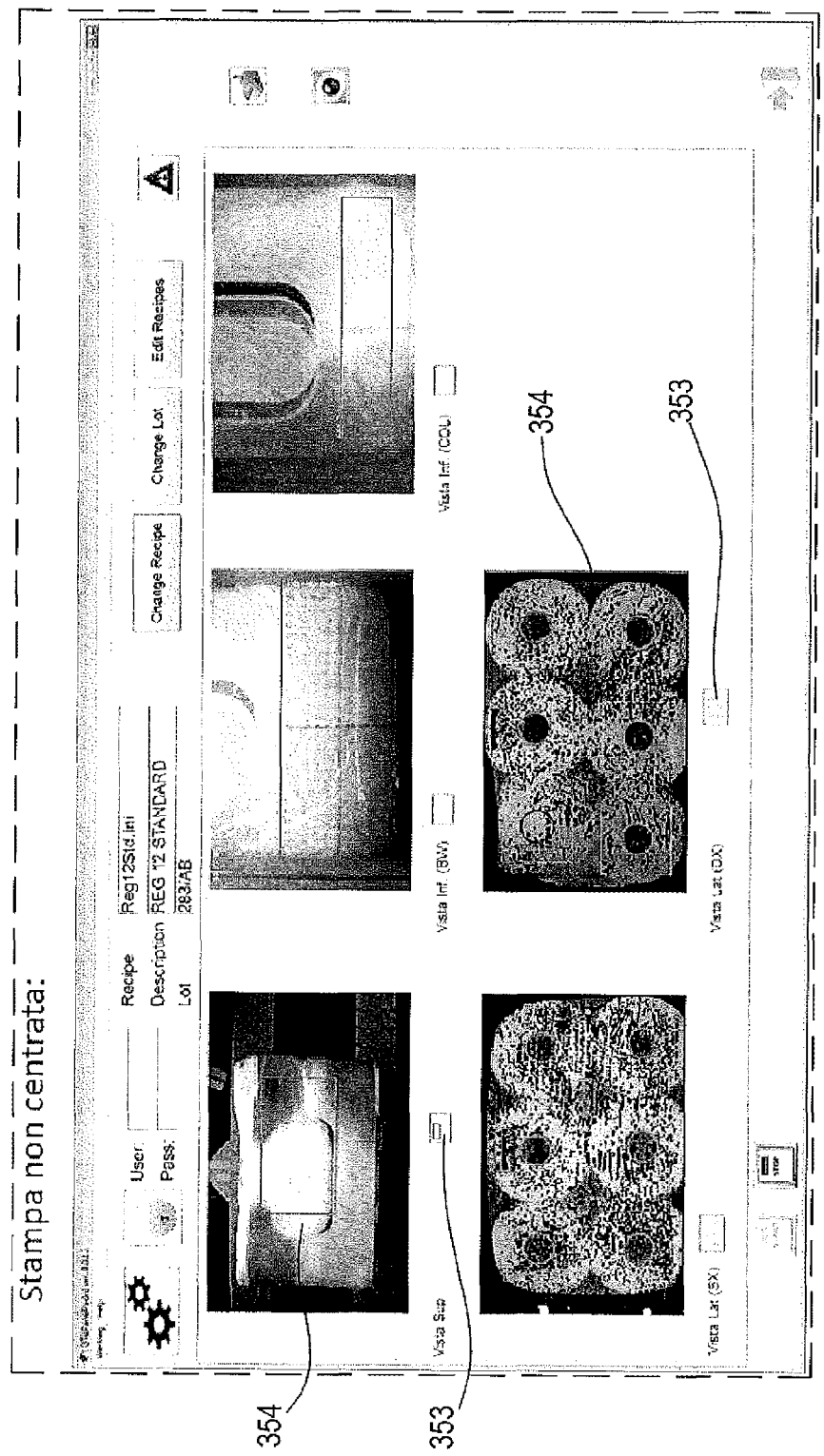
Figure 14E:
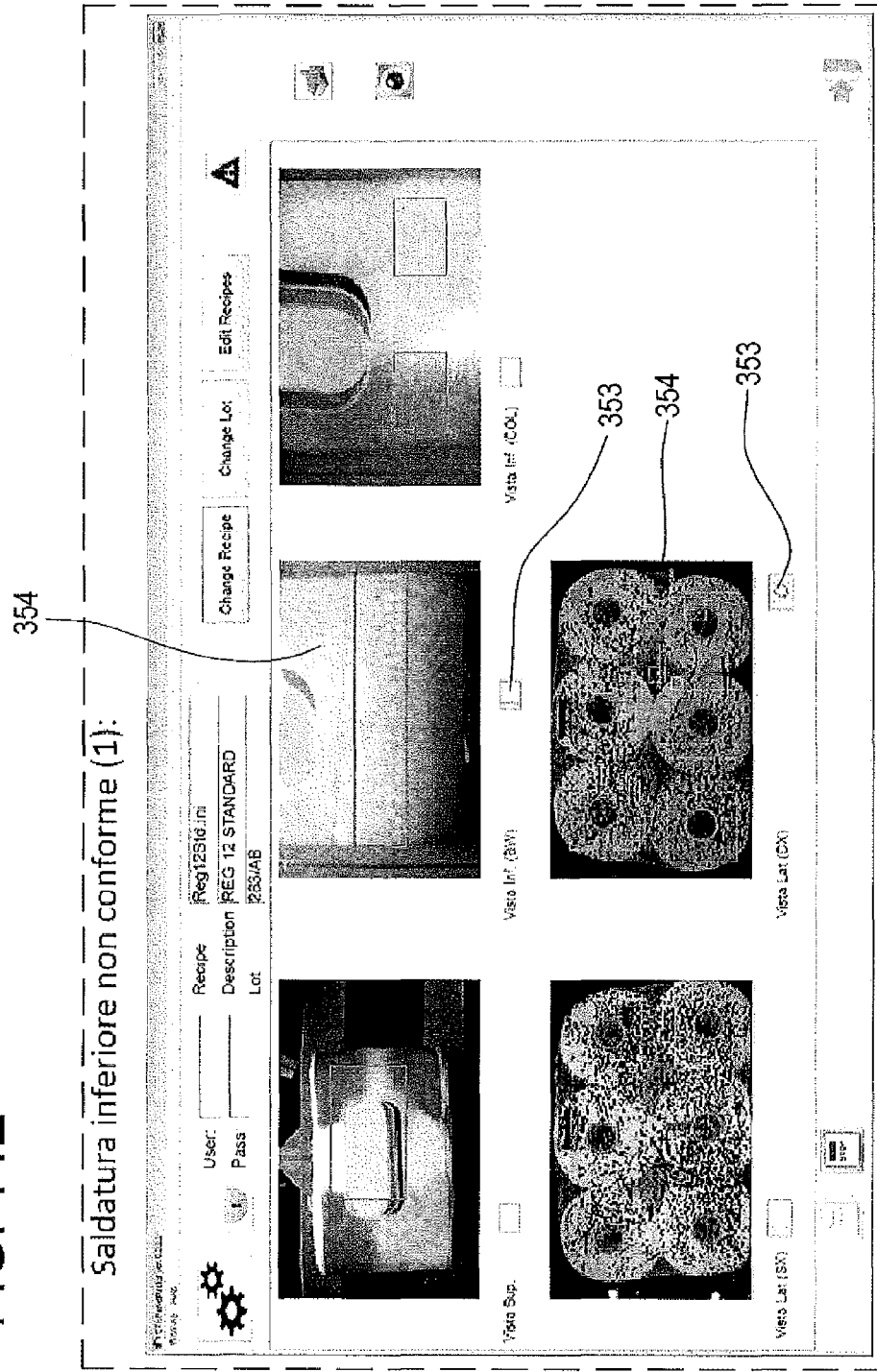
Figure 14F:
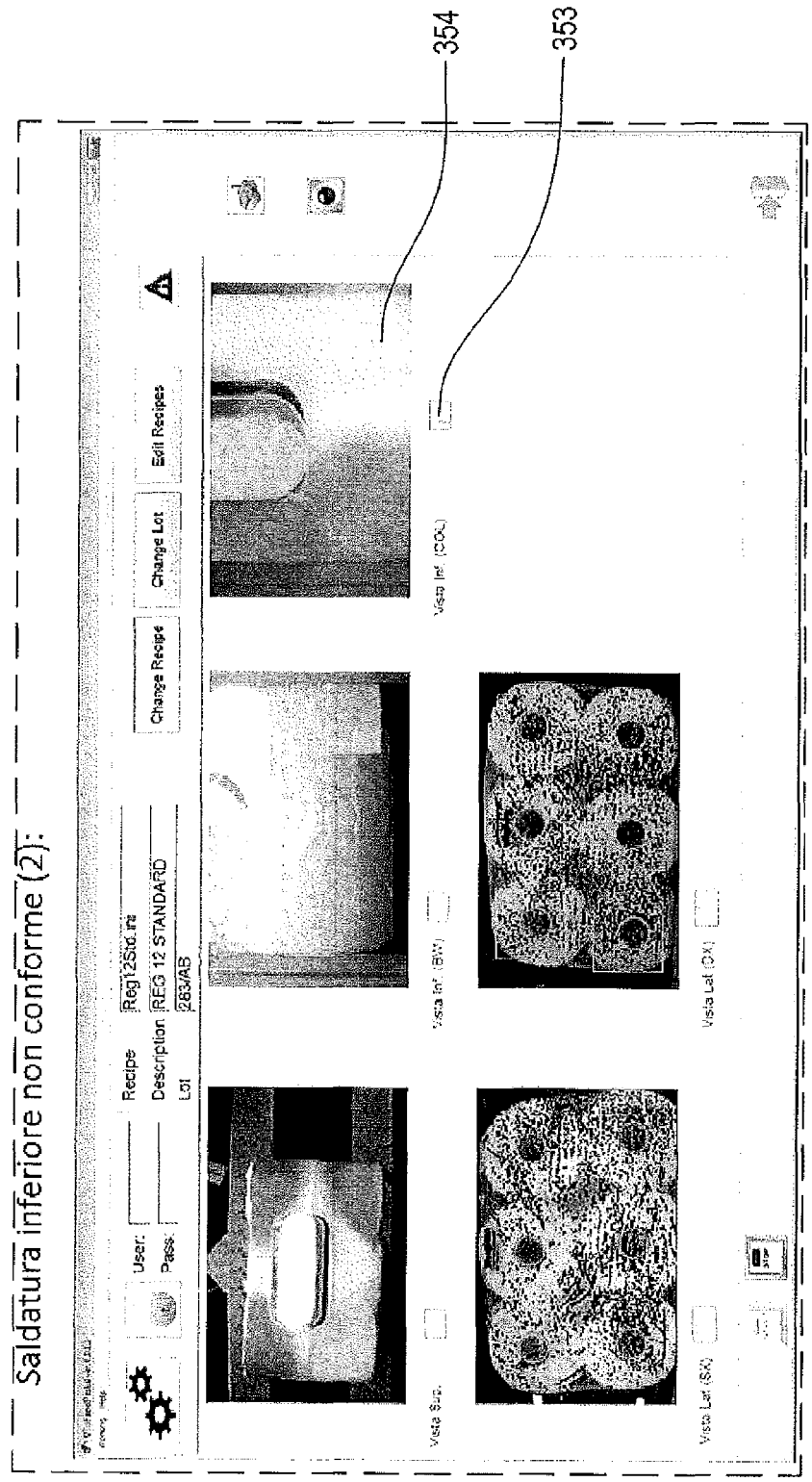
Figure 14G:
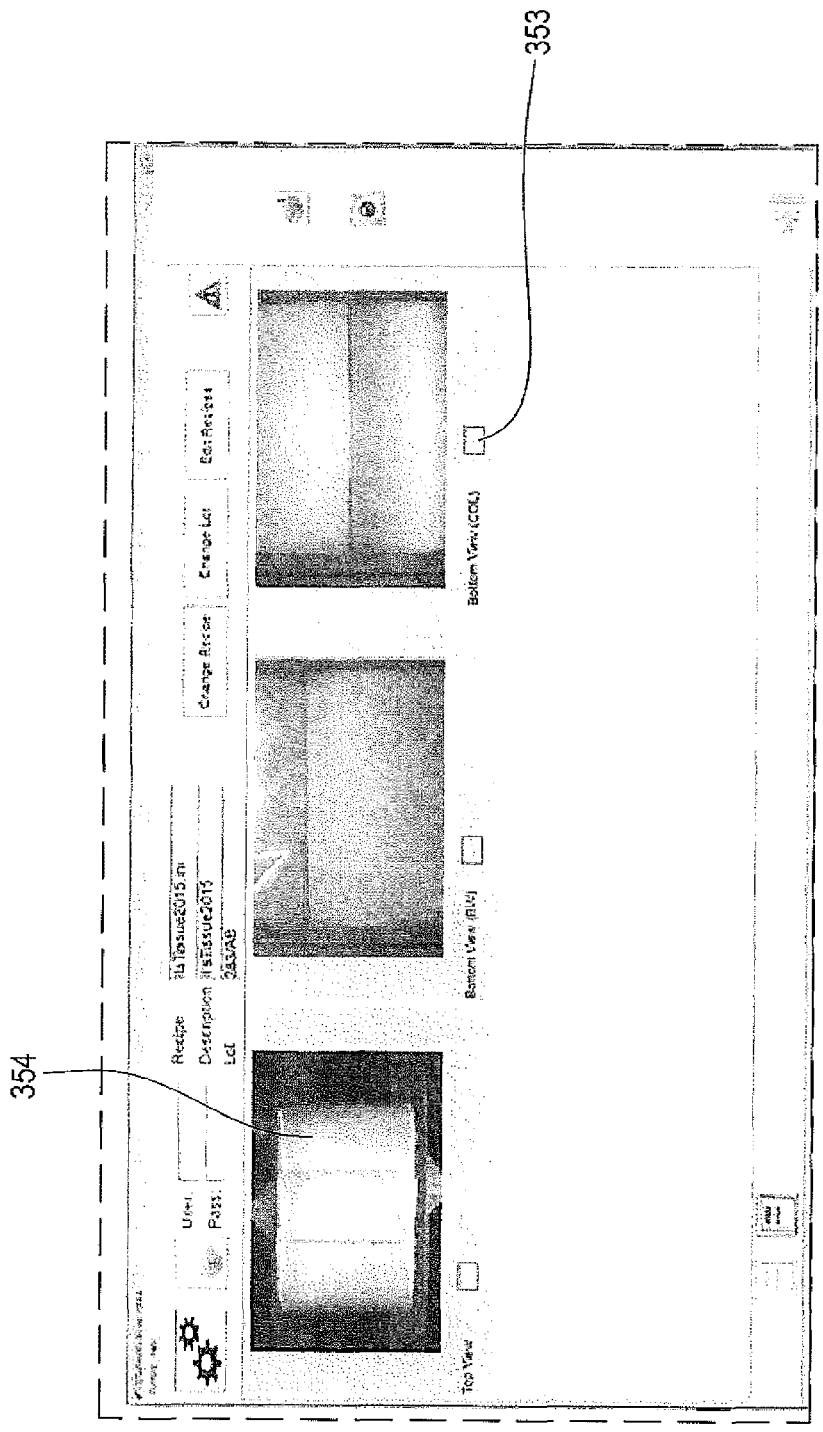

More specifically, thanks to the image capturing means described above, the further preferred embodiment 300 of the unit for detecting defective products comprises means adapted to determine one or more of the following defects:
  missing roll inside the pack;
  incorrect orientation of a roll inside the pack (as illustrated in FIG. 14C);
  defective lateral seal or lateral seal flaps detached (as illustrated in FIG. 14B);
  film printing not correctly centred (as illustrated in FIG. 14D);
  defective lateral seal or presence of openings in the film or wrapper on account of film melting or folding problems (as illustrated in FIG. 14G);
  defective underside transverse seal (as illustrated in FIG. 14E);
  paper ends trapped in the underside sealing zone between two sealed layers of film (as illustrated in FIG. 14F);
  missing or incorrectly positioned handle on the product or pack.

Obviously, besides packs like the one illustrated in FIG. 9, other types of packs can be processed by the unit 300. More specifically, the packs processed by this unit might contain a larger number of layers of articles or rolls than the single layer shown in FIG. 9, and, for example, might contain two or three layers of articles or rolls, as well as a different number of articles or rolls and/or rows of articles or rolls from those of the pack shown in FIG. 9 and, in particular, a larger number of articles or rolls and/or rows of articles or rolls than those contained in the pack of FIG. 9.

Like the preferred embodiments described above, the unit 300 allows detecting products, in the form of packs, as they move forward at a suitable speed, in particular at a speed of between 50 and 200 packs per minute.

Further, the product control or management unit 300, besides being able to control its conveying means directly through its own processing means, can be applied to an existing conveying line, where the conveying means of the plant, which are controlled, in particular, by the control means of the plant and which are made to move through the unit itself to allow the control or management unit 300 to detect and, if necessary, eliminate the products transported thereon.

Furthermore, for each product detected and analysed, an icon or drawing or any other graphical illustration is displayed on the display of the respective operator, in particular on the display of the control and management unit 300, to represent the state of the respective product or pack and, in particular, one or more of the following product states or conditions:
  product without defects or whose defectiveness is at a level considered acceptable;
  product defective, in particular having one or more specific types of defects or non-conformities.

In practice, for each product detected and analysed, an icon or drawing (or any other graphical illustration suitable for the purpose) is displayed on the display of the respective operator, in particular on the display of the control and management unit 300, to represent the state of the respective product or pack and that is to say, if the product is without defects or if its defectiveness is at a level considered acceptable, an icon or drawing (or any other graphical illustration suitable for the purpose) representing the product or pack is displayed whole, and/or if the product or pack has a respective defect or type of defect, a respective icon or drawing (or any other graphical illustration suitable for the purpose) representing the product or pack is displayed with respective parts or sections of it indicating the respective defect or type of defect of that product or pack.

Figure 15:
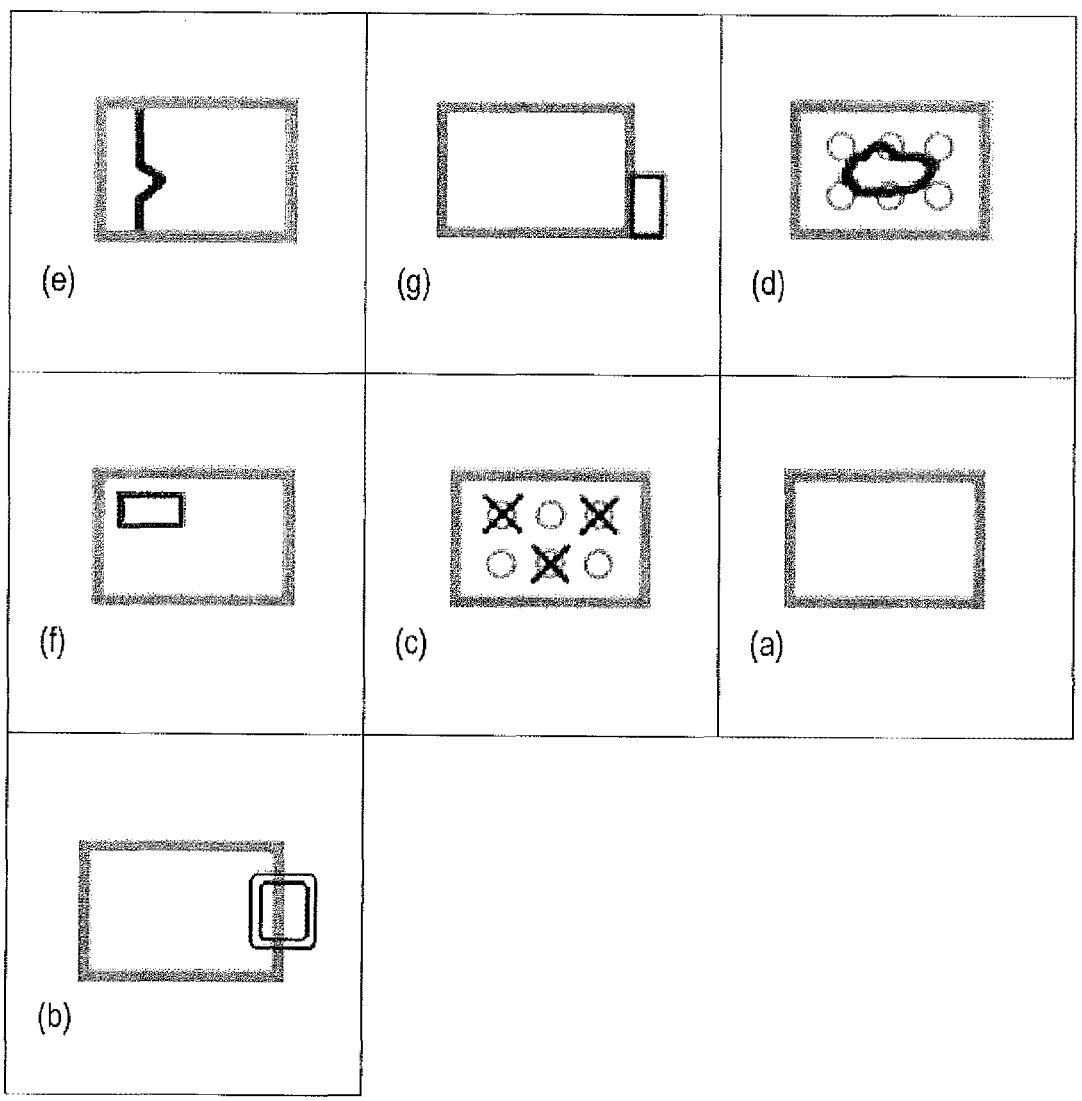
FIG. 15 shows the icons representing a corresponding condition of the pack detected.

More specifically, the unit 300 is adapted to display on the display of the respective operator, in particular on the display of the control and management unit 300 itself, an icon or drawing, illustrated in FIG. 15(*a*) an icon or drawing identifying the detection of a conformant pack, and/or an icon or drawing, illustrated in FIG. 15(*b*), identifying the detection of the presence or correct positioning of the pack handle, and/or an icon or drawing, illustrated in FIG. 15(*c*), identifying the detection of a missing roll inside the pack or the detection of an incorrectly oriented roll inside the pack, and/or an icon or drawing, illustrated in FIG. 15(*d*), identifying the detection of a lateral seal which is non-conforming or defective, and/or an icon or drawing, illustrated in FIG. 15(*e*), identifying the detection of a underside transverse seal which is non-conforming or defective, and/or an icon or drawing, illustrated in FIG. 15(*f*), identifying the detection of incorrectly positioned printing, that is to say, printing which is incorrectly spaced from the edges of the pack or which is inclined to the corresponding face of the pack it is applied to, and/or an icon or drawing, illustrated in FIG. 15(g), identifying the detection of a paper end trapped between two sealed layers of the film the pack is wrapped in.

Advantageously, the detection of a non-conforming or defective transverse seal on the product or pack is carried out by way of images captured by the bottom camera means 350, 351.

More specifically, advantageously, the detection, on the product or pack, of printing, in particular ornamental printing, and/or including trademarks and/or alphanumeric text, which is not correctly positioned, that is to say, which is incorrectly spaced from the edges of the pack or printing which is inclined to the corresponding face of the pack, is carried out by way of images captured by the top camera means 14.

More specifically advantageously, the detection of a paper end which is trapped between the two layers of the transvers seal of the film defining the outer wrapper of the product or pack is carried out by way of images captured by the bottom camera means 350, 351.

More specifically, advantageously, the detection of a missing roll inside the pack or the detection or an incorrectly oriented roll inside the pack is carried out by way of images captured by the side camera means 370, 390.

More specifically, advantageously, the detection of a non-conforming or defective lateral seal on the product or pack is carried out by way of images captured by the side camera means 370, 390.

More specifically, advantageously, the detection of the presence or correct positioning of the handle on the pack is carried out by way of images captured by the side camera means 370, 390.

Advantageously, the first and second camera means, in particular bottom camera means 350, 351, which are adapted to frame the same face of the product or pack, are adapted to produce different images of the respective face of the product.

More specifically the respective camera, in particular the respective side camera 370, 390, is adapted to capture images of the respective product face which are different from each other and which exhibit different states of reflection of the light that is incident upon the respective product face, these different states of reflection being conveniently generated by corresponding illumination provided by respective lighting means.

More specifically, advantageously, the electronic processing means of the unit 300, or respective electronic processing means of the plant the unit 300 is installed in or cooperates with, are configured to process the images captured and to determine whether or not the product has one or more corresponding defects, in particular the above described defects, relating to:
  missing roll inside the pack;
  incorrect orientation of a roll inside the pack (as illustrated in FIG. 14C);
  defective lateral seal or lateral seal flaps detached (as illustrated in FIG. 14B);
  film printing not correctly centred or oriented (as illustrated in FIG. 14D);
  defective lateral seal or presence of openings in the film or wrapper on account of film melting or folding problems (as illustrated in FIG. 14G);
  defective underside or transverse seal (as illustrated in FIG. 14E);
  paper end trapped in the underside or transverse sealing zone between two sealed layers of film to obtain the transverse seal (as illustrated in FIG. 14F);
  missing or incorrectly positioned handle on the product or pack.

Advantageously, in the further preferred embodiment, too, the electronic processing means might, for different product characteristics, imaginably determine the product defectiveness or acceptability from a value which is determined, or calculated, for a parameter representing a particular characteristic of the product itself.

More specifically, the acceptability or defectiveness of the product or pack is differentiated or classified based on a predetermined threshold value with which the determined or calculated value representing a specific characteristic of the product is compared.

Advantageously, the respective threshold value can be set as required directly by the operator in charge of supervising the unit and/or the plant, in particular from a respective operator panel, or means, in particular also in the form of a respective touch-screen display provided for the unit.

More specifically, for this unit, the threshold value set by the operator from a respective operator panel, or means, relates to one or more of the following defects: non-conformity of the lateral seals, non-conformity of the transverse or underside seal, incorrect position or orientation of the printing.

The operator in charge of supervising the unit and/or the plant, in particular from a respective operator panel, or means, can also set the system to check whether the product or pack has a handle or not and whether the handle is correctly positioned.

Advantageously, the operator in charge of supervising the unit and/or the plant, in particular from a respective operator panel, or means, can also call up manually or directly the specific configuration of the product or pack, selecting it from corresponding predetermined configurations of packs stored in a respective memory, in particular of the electronic processing means of the defective product detection unit 300, the predetermined configuration preferably defining the specific arrangement of the articles or rolls inside the product or pack, and/or their orientation.

It is, however, understood that, if necessary, the electronic processing or control means of the product processing unit might also be defined by corresponding electronic processing or control means of the plant the unit is installed in or cooperates, or even by other electronic control means.

It is also easy to imagine further embodiments of the invention comprising one or more of the features described herein. Moreover, it will be understood that all the details of the invention may be substituted for technically equivalent elements.

The invention claimed is:

1. A unit for control or management of packs containing rolls of paper, the unit being usable in a plant for making the packs, the plant comprising:
  an operating line including a section for making the packs containing rolls of paper;
  a packing section where the rolls are packed and enclosed in a transparent outer wrapping to form the packs;
  a conveying section by which the products are transported between one section of the plant and another;
  a detection system configured to detect and take external images of respective faces of outer surfaces of the outer wrapping of each of the packs and also internal images of interior contents of each of the packs through the transparent outer wrapping, the detection system including at least one camera and at least one illuminator; and a process control system for controlling functioning of the plant sections, the process control system including an electronic processor, the process control system suitable for analyzing the images of the packs for determining at least one chosen from the following defects with respect to each of the packs:

with respect to the internal images:
  missing roll inside the pack;
  incorrect orientation of a roll inside the pack;
  paper ends trapped in the sealing zone between two sealed layers of film;
with respect to the external images:
  defective lateral seal or lateral seal flaps detached;
  defective lateral seal or presence of openings in the film or a wrapper on account of film melting or folding problems;
  defective underside transverse seal;
  missing or incorrectly positioned handle on the pack;
wherein the at least one camera includes:
  a first top camera positioned above the conveying section and having a lens directed perpendicularly or substantially perpendicularly, to at least one chosen from a product supporting and transporting surface of the conveying section and a face of the pack to be detected;
  a second bottom camera adapted to take snapshots of the pack from below from below the pack to capture at least one image of an underside face of the pack; and wherein the second camera includes a lens directed perpendicularly, or substantially perpendicularly, to an underside surface of the pack;
  third and fourth side cameras adapted to take snapshots of the pack from both sides to capture at least one image of both lateral faces of the pack; wherein lenses of the third and fourth side cameras are directed at least one chosen from parallel or substantially parallel to a product supporting surface of the conveying section and perpendicular to lateral faces of the pack;
wherein the second bottom camera is configured for taking images of the pack for detecting:
  the paper ends trapped in the sealing zone between the two sealed layers of the film defining an outer wrapper of the pack;
  the defective underside transverse seal.

2. The unit according to claim 1, and further comprising a frame or supporting structure which mounts an elimination device configured for eliminating defective packs.

3. The unit according to claim 1, wherein the first top camera is configured for taking images of the pack for detecting defective printing of the pack.

4. The unit according to claim 1, wherein at least one of the third or fourth side cameras is configured for taking images of the pack for detecting the missing roll inside the pack or the incorrect orientation of the roll inside the pack.

5. The unit according to claim 1, wherein at least one of the third or fourth side cameras is configured for taking images of the pack for detecting the defective lateral seal on the pack.

6. The unit according to claim 1, wherein at least one of the third or fourth side cameras is configured for taking images of the pack for detecting the missing or incorrectly positioned handle on the pack.

7. The unit according to claim 1, and further comprising an operator display, wherein the process control system is configured to display on the operator display, for each pack detected and analyzed, an icon or drawing or other graphical illustration representing at least one of the following states of the pack:
  without defects or having a defectiveness at a level considered acceptable;
  defective, having one or more specific types of defects or non-conformities.

8. The unit according to claim 7, wherein the process control system is configured to display on the operator display, for each pack detected and analyzed, the icon or drawing or other graphical illustration, wherein if the pack is without defects or has a defectiveness at a level considered acceptable, the icon or drawing or other graphical illustration is displayed whole, and if the pack has a respective defect or type of defect, the icon or drawing or other graphical illustration is displayed with respective parts or sections indicating the respective defect or type of defect of the pack.

9. The unit according to claim 8, wherein the process control system is configured to display on the operator display, for each pack detected and analyzed, the respective icon or drawing identifying detection of at least one chosen from a conformant pack, the missing or incorrectly positioned handle, the missing roll inside the pack or the incorrect orientation of the roll inside the pack, the defective lateral seal, the defective underside transverse seal, incorrectly positioned print, and the paper end trapped in the sealing zone between two sealed layers of the film the pack is wrapped in.

10. The unit according to claim 1, wherein the first top camera is configured for taking images of the pack for detecting defective printing including ornamental printing, trademarks or alphanumeric text, which is incorrectly spaced from edges of the pack or which is inclined to a corresponding face of the pack.

* * * * *